US012559332B2

(12) United States Patent
Tezuka

(10) Patent No.: US 12,559,332 B2
(45) Date of Patent: Feb. 24, 2026

(54) IMAGE READING DEVICE

(71) Applicant: SEIKO EPSON CORPORATION, Tokyo (JP)

(72) Inventor: Seiji Tezuka, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 208 days.

(21) Appl. No.: 18/463,035

(22) Filed: Sep. 7, 2023

(65) Prior Publication Data

US 2024/0083701 A1     Mar. 14, 2024

(30) Foreign Application Priority Data

Sep. 8, 2022     (JP) ................................. 2022-143020

(51) Int. Cl.
| | |
|---|---|
| *B65H 5/06* | (2006.01) |
| *B65H 5/36* | (2006.01) |
| *H04N 1/00* | (2006.01) |

(52) U.S. Cl.
CPC .............. *B65H 5/062* (2013.01); *B65H 5/36* (2013.01); *H04N 1/00615* (2013.01); *B65H 2402/441* (2013.01); *B65H 2404/6111* (2013.01)

(58) Field of Classification Search
CPC . B65H 5/062; B65H 5/36; B65H 5/38; H04N 1/00615
See application file for complete search history.

(56) References Cited

U.S. PATENT DOCUMENTS

| | | | | |
|---|---|---|---|---|
| 8,387,979 B2 * | 3/2013 | Nagura | .................. | H04N 1/121 271/274 |
| 9,776,817 B2 * | 10/2017 | Matsumoto | .............. | B65H 5/36 |
| 10,647,534 B2 * | 5/2020 | Nakata | .................. | G03G 15/70 |

FOREIGN PATENT DOCUMENTS

JP          2004-175534 A      6/2004

* cited by examiner

*Primary Examiner* — Patrick Cicchino
(74) *Attorney, Agent, or Firm* — WORKMAN NYDEGGER

(57) ABSTRACT

An image reading device includes an inner roller and an outer roller in a curved path, and a path forming member that forms an outer side of a first path portion when a path portion extending downstream in a conveying direction from a nip position between the inner roller and the outer roller in the curved path is defined as the first path portion, wherein a support portion that supports a trailing end of a medium is provided on a lateral side of the outer roller in a swing member that rotatably supports the outer roller, and the support portion protrudes further inward of the curved path than the path forming member in the first path portion.

11 Claims, 22 Drawing Sheets

IMAGE READING DEVICE

The present application is based on, and claims priority from JP Application Serial Number 2022-143020, filed Sep. 8, 2022, the disclosure of which is hereby incorporated by reference herein in its entirety.

BACKGROUND

1. Technical Field

The present disclosure relates to an image reading device for reading an image on a medium.

2. Related Art

In the document feeding device disclosed in JP-A-2004-175534, a document placed on a document placement portion is fed by a feeding start roller, then curved and inverted, and read by a reading means after the inversion. A feeding roller and a driven roller are provided upstream from the reading means, and the document is fed to the reading means by these rollers.

In the document feeding device described in JP-A-2004-175534, the document is curved, and thus, when a trailing end of the document comes out of the nip between the feeding roller and the driven roller, the trailing end of the document may suddenly move out of an inversion path, thereby causing temporary conveyance disturbance and leading to distortion of a read image.

SUMMARY

In order to solve the above problems, an image reading device according to the present disclosure includes: an inversion path including a curved path that inverts a medium while curving the medium, an inner roller that is provided on an inner side of the curved path and conveys the medium downstream in a conveying direction thereof, an outer roller that is provided on an outer side of the curved path and nips the medium with the inner roller, a first reading portion that is located downstream in the conveying direction from the inner roller and the outer roller and reads an image on the medium, a swing member that is a member rotatably supporting the outer roller, is swingable, and swings to move the outer roller closer to and away from the inner roller, and a path forming member that forms an outer side of a first path portion when a path portion of the curved path extending downstream in the conveying direction from the nip position between the inner roller and the outer roller is defined as the first path portion, wherein a part of a circumferential surface of the inner roller forms an inner side of the first path portion, a support portion that supports a trailing end of the medium that is out of the nip position is provided in the swing member laterally with respect to the outer roller in a width direction that is a direction intersecting the conveying direction, and the support portion protrudes further inward of the curved path than the path forming member in the first path portion.

DESCRIPTION OF EMBODIMENTS

Figure 1:
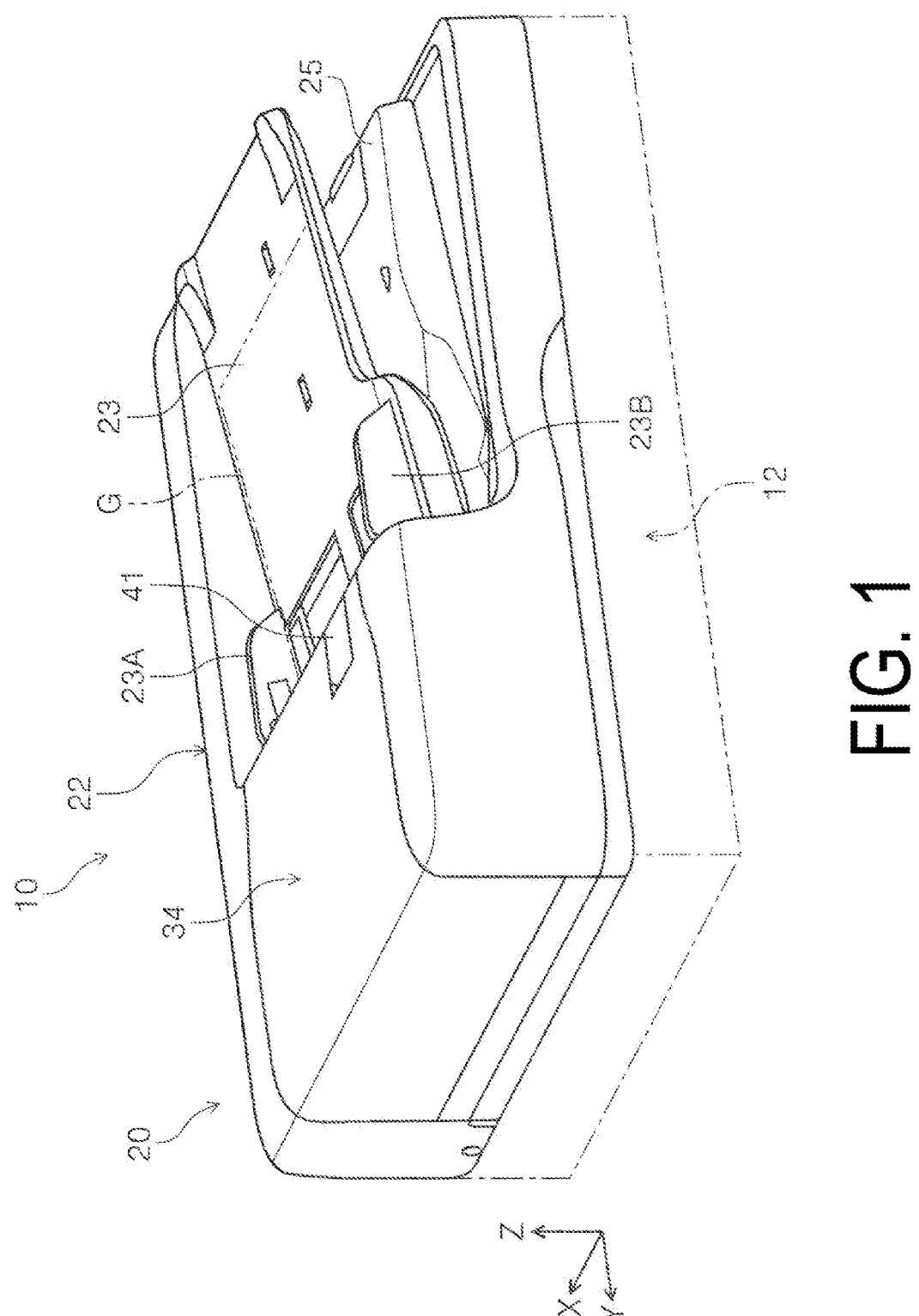
FIG. 1 is a perspective view of a scanner in a state in which both a document conveying device and a cover unit are closed.

The present disclosure will be schematically described below.

An Image reading device according to a first aspect includes: an inversion path including a curved path that inverts a medium while curving the medium, an inner roller that is provided on an inner side of the curved path and conveys the medium downstream in a conveying direction thereof, an outer roller that is provided on an outer side of the curved path and nips the medium with the inner roller, a first reading portion that is located downstream in the conveying direction from the inner roller and the outer roller and reads an image on the medium, a swing member that is a member rotatably supporting the outer roller, is swingable, and swings to move the outer roller closer to and away from the inner roller, and a path forming member that forms an outer side of a first path portion when a path portion of the curved path which extends downstream in the conveying direction from the nip position between the inner roller and the outer roller is defined as the first path portion, and is characterized in that a part of a circumferential surface of the inner roller forms an inner side of the first path portion, a support portion that supports a trailing end of the medium that is out of the nip position is provided in the swing member laterally with respect to the outer roller in a width direction that is a direction intersecting the conveying direction, and the support portion protrudes further inward of the curved path than the path forming member in the first path portion.

The medium is curved in the curved path, and thus, when the trailing end of the medium moves out of the nip position between the inner roller and the outer roller, the trailing end of the medium suddenly moves to the outside of the first path portion. However, according to this aspect, the support portion that supports the trailing end of the medium that is out of the nip position is provided in the swing member laterally with respect to the outer roller in the width direction, which is a direction intersecting the conveying direction, and the support portion protrudes further inward of the curved path than the path forming member in the first path portion, and thus, when the trailing end of the medium moves out of the nip position, the trailing end of the medium is supported by the support portion. For this reason, sudden movement of the trailing end of the medium to the outside of the first path portion is inhibited, so that temporary distortion of a read image can be inhibited.

In addition, the sudden movement of the trailing end of the medium to the outside of the first path portion can also be inhibited by increasing a protruding height of the path forming member to the inner side of the curved path, but in this case, a clearance (a clearance in a thickness direction of the medium) in the first path portion becomes small, thereby increasing a conveying load when a thick medium or a medium having high rigidity is conveyed. However, in this aspect, since the support portion is provided in the swingable swing member, the support portion can be displaced in accordance with a thickness or rigidity of the medium, so that the conveying load when a thick medium or a medium having high rigidity is conveyed can be curbed.

A second aspect is characterized in that, in the first aspect, the support portions are provided on both sides of the outer roller in the width direction.

According to this aspect, the support portions are provided on both sides of the outer roller in the width direction, and thus, when the trailing end of the medium moves out of the nip position, the trailing end of the medium can be stably supported, and the temporary distortion of the read image can be satisfactorily inhibited.

A third aspect is characterized in that, in the second aspect, the support portion protrudes further inward of the first path portion than the path forming member in the entire region of the first path portion.

According to this aspect, since the support portion protrudes further inward of the first path portion than the path forming member in the entire region of the first path portion, a relative position between the nip position and the support portion is determined in the entire region of the first path portion, and thus the trailing end of the medium that is out of the nip position can be appropriately supported by the support portion.

Also, this aspect is not limited to the second aspect and may be applied to the first aspect.

A fourth aspect is characterized in that, in the third aspect, the support portion extends to a downstream end of the swing member in the conveying direction.

According to this aspect, since the support portion extends to the downstream end of the swing member in the conveying direction, the trailing end of the medium that is out of the nip position can be supported over a wide region in the conveying direction. In this way, sudden movement of the trailing end of the medium to the outside of the curved path can be appropriately inhibited, and thus temporary distortion of the read image can be appropriately inhibited.

Also, this aspect is not limited to the third aspect and may be applied to the first or second aspect.

A fifth aspect is characterized in that, in the third aspect, the first path portion extends from the nip position to a position advanced, from the nip position, by an angle of 30° downstream in the conveying direction around a rotation axis center of the inner roller.

According to this aspect, since the first path portion extends from the nip position to the position advanced, from the nip position, by an angle of 30° downstream in the conveying direction around the rotation axis center of the inner roller, the trailing end of the medium that is out of the nip position can be supported over a wide region in the conveying direction. In this way, sudden movement of the trailing end of the medium to the outside of the curved path can be appropriately inhibited, and thus temporary distortion of the read image can be appropriately inhibited.

Also, this aspect is not limited to the third aspect and may be applied to any one of the first, second, and fourth aspects.

A sixth aspect is characterized in that, in the third aspect, a maximum value of a clearance between the support portion and the circumferential surface of the inner roller in the first path portion is equal to or less than twice the clearance at the nip position.

According to this aspect, since the maximum value of the clearance between the support portion and the circumferential surface of the inner roller in the first path portion is equal to or less than twice the clearance at the nip position, the clearance downstream from the nip position does not rapidly increase as compared to the clearance at the nip position. In this way, sudden movement of the trailing end of the medium to the outside of the curved path after the trailing end of the medium moved out of the nip position is appropriately inhibited, and thus temporary distortion of the read image can be appropriately inhibited.

Also, this aspect is not limited to the third aspect and may be applied to any one of the first, second, fourth, and fifth aspects.

A seventh aspect is characterized in that, in the first aspect, the support portion serves a first support portion, and the swing member integrally includes a second support portion that supports the trailing end of the medium downstream from the outer roller in the conveying direction and on a lateral side of the first support portion in the width direction.

According to this aspect, since the support portion serves as the first support portion, and the swing member integrally includes the second support portion that supports the trailing end of the medium downstream from the outer roller in the conveying direction and on the lateral side of the first support portion in the width direction, the trailing end of the medium that is not supported by the first support portion is supported by the second support portion, and thus the medium can be stably conveyed.

Also, this aspect is not limited to the first aspect and may be applied to any one of the second to sixth aspects.

An eighth aspect is characterized in that, in the seventh aspect, the second support portion does not protrude further inward of the curved path than the first support portion.

According to this aspect, since the second support portion does not protrude further inward of the curved path than the first support portion, the clearance of the curved path does not become narrower than necessary, and the conveying load can be curbed and thus the distortion of the read image can be inhibited.

A ninth aspect is characterized in that, in the eighth aspect, the second support portion includes a plurality of ribs disposed at intervals in the width direction.

According to this aspect, since the second support portion is configured by the plurality of ribs disposed at intervals in the width direction, its contact area with the medium can be reduced, the conveying load can be curbed, and thus the distortion of the read image can be inhibited.

Also, this aspect is not limited to the eighth aspect and may be applied to the seventh aspect.

A tenth aspect is characterized in that, in the first aspect, the support portion includes a rib extending in the conveying direction.

According to the aspect, since the support portion is configured by the rib extending in the conveying direction, the contact area with the medium can be reduced, the conveying load can be curbed, and thus the distortion of the read image can be inhibited.

Also, this aspect is not limited to the first aspect and may be applied to any one of the second to ninth aspects.

An eleventh aspect is characterized in that, in the first aspect, the support portion is configured by a deformable member that is deformable by coming into contact with the medium.

According to this aspect, the support portion is configured by the deformable member that is deformable by coming into contact with the medium, and thus, when the trailing end of the medium moves out of the nip position, the trailing end of the medium abuts the deformable member, and movement of the trailing end of the medium to the outside of the curved path is inhibited due to elasticity of the deformable member. For this reason, sudden movement of the trailing end of the medium to the outside of the curved path is inhibited, and thus temporary distortion of the read image can be inhibited.

Also, this aspect is not limited to the first aspect and may be applied to any one of the second to ninth aspects.

A twelfth aspect is characterized in that, in the first aspect, the support portion is configured by a driven roller configured to be driven to rotate by coming into contact with the medium.

According to this aspect, since the support portion is configured by the driven roller configured to be driven to rotate by coming into contact with the medium, the conveying load can be curbed, and thus distortion of the read image can be inhibited.

Also, this aspect is not limited to the first aspect and may be applied to any one of the second to ninth aspects.

A thirteenth aspect is characterized in that, in the first aspect, the first reading portion is located outside the inversion path and includes a pressing portion at a position on an inner side of the inversion path and facing the first reading portion with the inversion path interposed therebetween, the pressing portion being configured to move closer to and away from the first reading portion and to press the medium toward the first reading portion, a regulating portion that regulates movement of the medium in a direction away from the first reading portion is provided downstream from the pressing portion in the conveying direction, and a guiding unit that guides the medium to a top portion of the regulating portion is provided between the pressing portion and the regulating portion in the conveying direction.

According to this aspect, since the pressing portion that is movable closer to and away from the first reading portion and presses the medium toward the first reading portion is provided at the position facing the first reading portion, the pressing portion is displaced in accordance with the thickness of the medium, so that an interval between a surface of the medium and the first reading portion can be appropriately maintained regardless of the thickness of the medium.

Here, when the pressing portion receives an excessive reaction force from the medium, the pressing portion is inappropriately pushed up, and the interval between the surface of the medium and the first reading portion is inappropriately increased, but the regulating portion that regulates the movement of the medium in the direction away from the first reading portion is provided downstream from the pressing portion in the conveying direction, and thus it is possible to inhibit the pressing portion from being inappropriately pushed up.

Here, when a leading end of the medium is about to pass through the regulating portion, there is a concern that the leading end of the medium may be caught by the regulating portion, conveying accuracy may be temporarily reduced, and distortion of the read image may be caused, but according to this aspect, since the guiding unit that guides the medium to the top portion of the regulating portion is provided between the pressing portion and the regulating portion in the conveying direction, it is possible to inhibit reduction in conveying accuracy and inhibit distortion of the read image.

Also, this aspect is not limited to the first aspect and may be applied to any one of the first to twelfth aspects.

A fourteenth aspect is characterized in that, in the first aspect, a first unit that forms the inner side of the inversion path and includes the inner roller, a second unit that forms the outer side of the inversion path and retracts with respect to the first unit to open a part of the inversion path, and a third unit that forms the outer side of the inversion path downstream from the second unit in the conveying direction, includes the path forming member, and is provided rotatably around a first rotation shaft to be movable closer to and away from the first unit are provided, the swing member is rotatably provided in the third unit via a second rotation shaft, the second unit is configured to apply a pressing force to the support portion in accordance with an opening operation thereof, the swing member is rotatable in a direction in which the outer roller moves away from the inner roller by receiving a force from the second unit, and the third unit is rotatable in a retracting direction with respect to the first unit by receiving a force from the swing member in accordance with the opening operation of the second unit.

According to this aspect, when a so-called jam state occurs in which the deformed medium is jammed in the inversion path, the second unit is retracted with respect to the first unit, and thus a part of the inversion path is open. In this case, the second unit applies a pressing force to the swing member in accordance with the opening operation.

The swing member is rotated about the second rotation shaft by receiving a force from the second unit. Thus, the outer roller is separated from the inner roller.

The third unit is rotated about the first rotation shaft by receiving a force from the swing member. Thus, the third unit is retracted from the first unit.

As described above, since the swing member is rotated in accordance with the opening operation of the second unit and the third unit is rotated relative to the swing member, it is possible to easily remove the medium in the jam state from the inversion path as compared to a configuration in which at least one of the swing member and the third unit is fixed.

Also, this aspect is not limited to the first aspect and may be applied to any one of the first to thirteenth aspects.

A scanner 10 and a document conveying device 20 according to an example of an embodiment of the present disclosure will be specifically described below.

As shown in FIG. 1, the scanner 10 is a device that reads a document G serving as an example of a medium. An XYZ coordinate system shown in each figure is a rectangular coordinate system.

An X direction is an example of a width direction of the document G and a device depth direction, and is also an example of an intersecting direction intersecting a conveying direction of the document G. In this embodiment, a –X direction is a direction toward a device front surface side, and a +X direction is a direction toward a device back surface side.

A Y direction is an example of a device width direction, and a +Y direction is a direction toward a left side and a –Y direction is a direction toward a right side as viewed from a user.

A Z direction is an example of a device height direction and an example of a vertical direction. A+Z direction is upward, and a –Z direction is downward.

In a state in which the scanner 10 is viewed from the device front surface side in the +X direction, a clockwise rotation direction is defined as a +R direction, and a counterclockwise rotation direction is defined as a –R direction.

Figure 2:
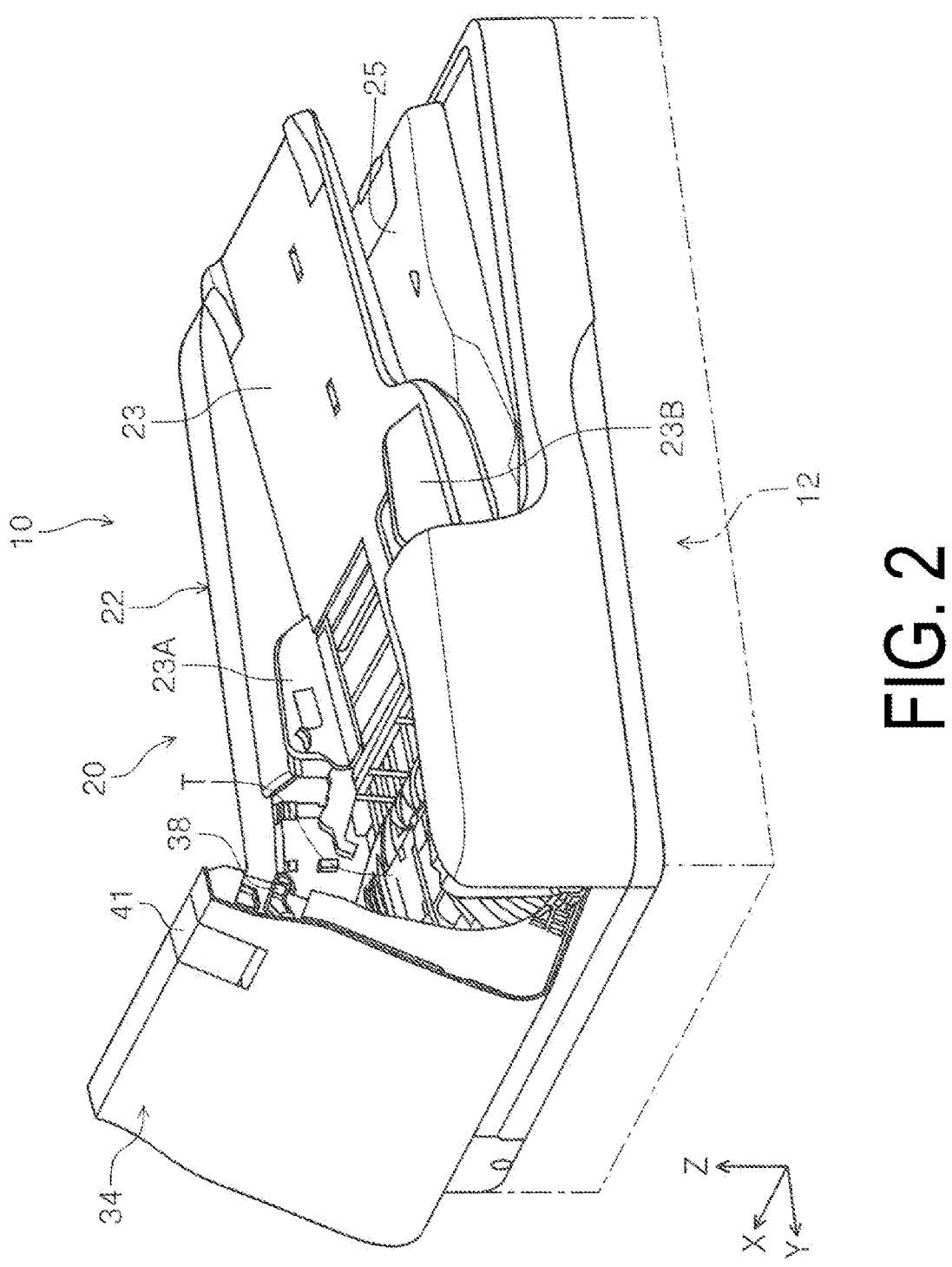
FIG. 2 is a perspective view of the scanner in a state in which the document conveying device is closed and the cover unit is open.

The scanner 10 is shown in FIGS. 1 and 2.

The scanner 10 is an example of an image reading device that reads the document G. The scanner 10 includes a lower device 12 that forms a lower portion of the scanner 10 in the Z direction, and a document conveying device 20 that forms an upper portion of the scanner 10 in the Z direction and conveys the document G.

The lower device 12 is an example of a base unit and supports the document conveying device 20.

Figure 4:
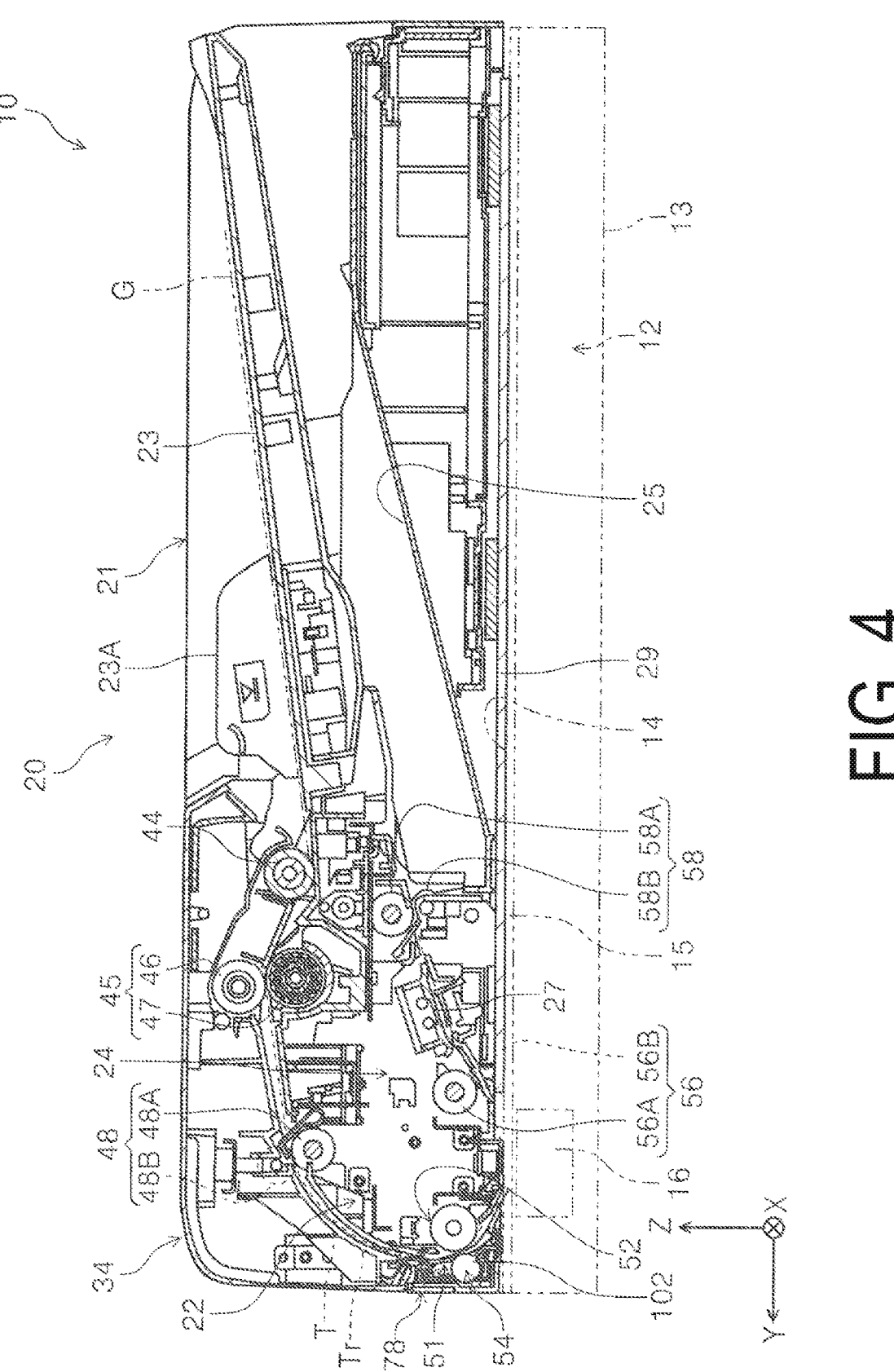
FIG. 4 is a diagram showing a document inversion path in a state in which both the document conveying device and the cover unit are closed.

As shown in FIG. 4, in the document conveying device 20 described later, the document G is conveyed along the inversion path T. A direction in which the document G is conveyed is referred to as the conveying direction of the document G. Also, the inversion path T includes not only a linear portion but also a semicircular portion, which will be described later. For this reason, the conveying direction of the document G is not a constant direction.

The inversion path T is a path extending from a separation roller pair 45 to a discharge roller pair 58, which will be described later, and is a path along which the document G is conveyed. When viewed in the X direction, the inversion path T is configured to include the semicircular portion that is convex in the +Y direction. The inversion path T inverts the front surface and the back surface of the document G while curving the document G. In the following description, the semicircular portion of the inversion path T is referred to as an arc portion Tr.

The lower device 12 is configured to include a frame serving as a framework (not shown), a main body cover 13, a document table glass 15, and a first reading portion 16.

The main body cover 13 is formed in a frame shape. An end surface of the main body cover 13 in the +Z direction is defined as an upper surface 14.

The document table glass 15 is provided inside the main body cover 13.

The first reading portion 16 is provided to be movable in the Y direction at a position in the –Z direction with respect to the document table glass 15. For the first reading portion 16, for example, an optical sensor of a CIS system, a CCD system, or the like is used. The first reading portion 16 is an example of a reading portion and reads one surface of the document G conveyed in the inversion path T or the document G placed on the document table glass 15.

The document conveying device 20 is an example of a medium conveying device that conveys the document G toward the first reading portion 16 or a second reading portion 27, which will be described later. For example, the document conveying device 20 includes a device main body portion 21, a conveying roller 52, and a driven roller 54.

The device main body portion 21 is configured to include a main body unit 22, a cover unit 34, a movable unit 78, and a roller support unit 102.

Figure 3:
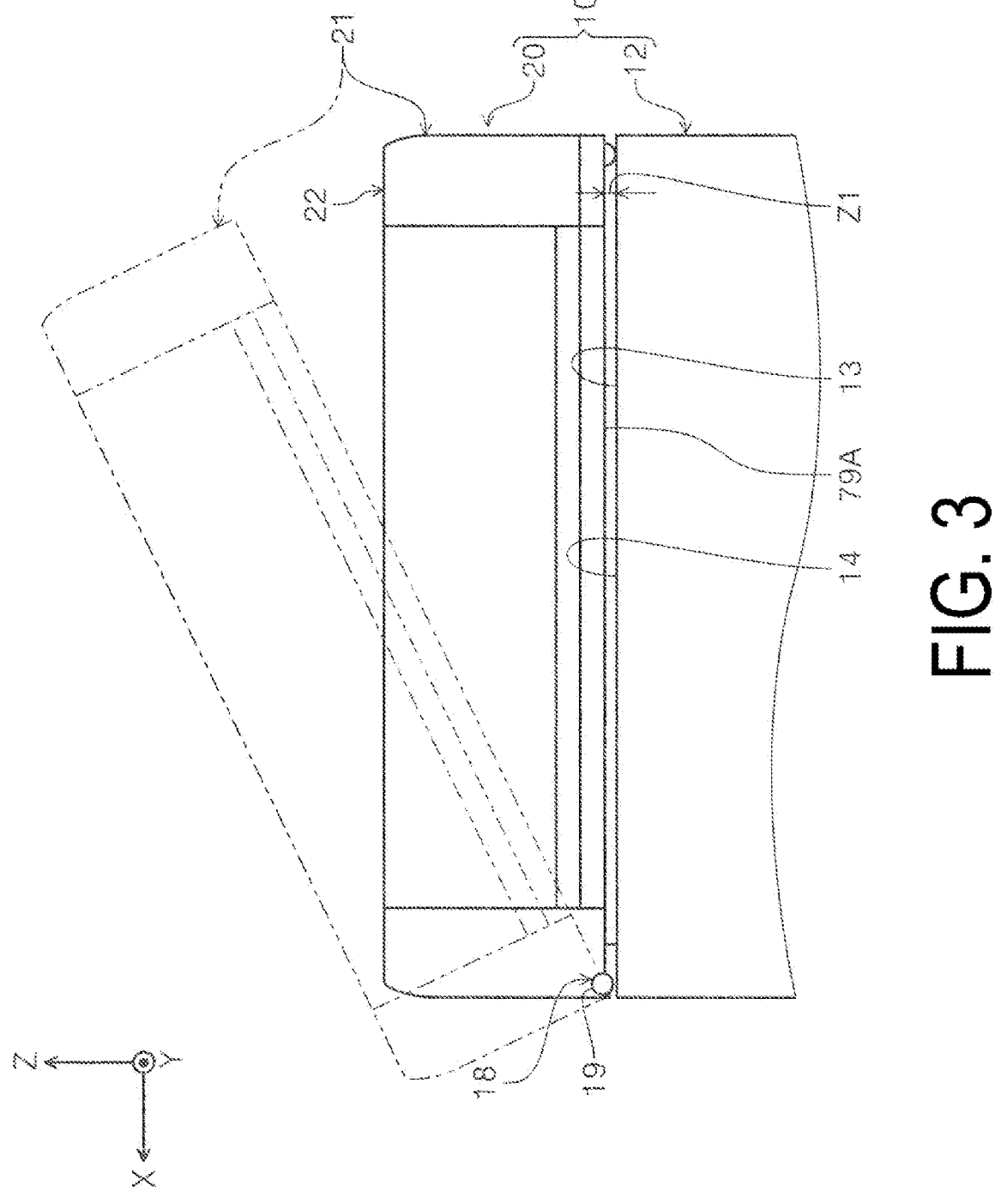
FIG. 3 is a side view schematically showing the scanner in a state in which the document conveying device is open.

As shown in FIG. 3, an end portion in the +X direction of an end portion in the +Z direction of the lower device 12 and an end portion in the +X direction of an end portion in the –Z direction of the device main body portion 21 are connected to each other by a hinge portion 18. The hinge portion 18 includes a shaft portion 19 extending in the Y direction.

When the device main body portion 21 is rotated about the shaft portion 19, the document conveying device 20 is open and closed with respect to the lower device 12. In this way, the device main body portion 21 is coupled to the lower device 12 to be openable and closable.

In an open state of the document conveying device 20, the upper surface 14 of the lower device 12 is exposed. In a closed state of the document conveying device 20, the upper surface 14 is covered by the device main body portion 21.

Here, an interval between the document conveying device 20 and the lower device 12 in the Z direction is referred to as an interval Z1. To be specific, the interval Z1 corresponds to an interval between the upper surface 14 and a surface located at the endmost position in the –Z direction of a bottom wall 79A (FIG. 12) of the movable unit 78, which will be described later.

In a state in which the end portion of the lower device 12 in the +Z direction is covered by the document conveying device 20, the interval Z1 is set to be relatively narrow, and thus the movable unit 78 comes into contact with the end portion of the lower device 12 in the +Z direction. Thus, opening of the movable unit 78 is regulated.

On the other hand, in a state in which the end portion of the lower device 12 in the +Z direction is open by the document conveying device 20, a regulated state of the movable unit 78 by the lower device 12 is released, and thus the movable unit 78 can be open.

As shown in FIG. 4, the main body unit 22 is an example of a first unit. The main body unit 22 forms an inner portion of the arc portion Tr. The main body unit 22 includes a frame member 24. In addition, the main body unit 22 is provided with a document placing portion 23, a document discharge portion 25, and a second reading portion 27.

The document placing portion 23 is formed in a plate shape. The document placing portion 23 is positioned in a state in which it is inclined toward the inversion path T. The document G before conveyance is placed on the document placing portion 23. In the document placing portion 23, an edge guide 23A is provided at an end portion in the +X direction, and an edge guide 23B (FIG. 1) is provided at an end portion in the −X direction. The edge guides 23A and 23B are provided to be slidable in a direction in which they come closer to or separate from each other, and align both end portions of a plurality of documents G in the X direction.

The document discharge portion 25 is positioned in the −Z direction with respect to the document placing portion 23. The document G that was conveyed is placed on the document discharge portion 25.

For the second reading portion 27, for example, an optical sensor of a CIS system, a CCD system, or the like is used. The second reading portion 27 is an example of a reading unit that reads the other surface of the conveyed document G. That is, the scanner 10 can read both sides of the document G using the first reading portion 16 and the second reading portion 27.

Figure 5:
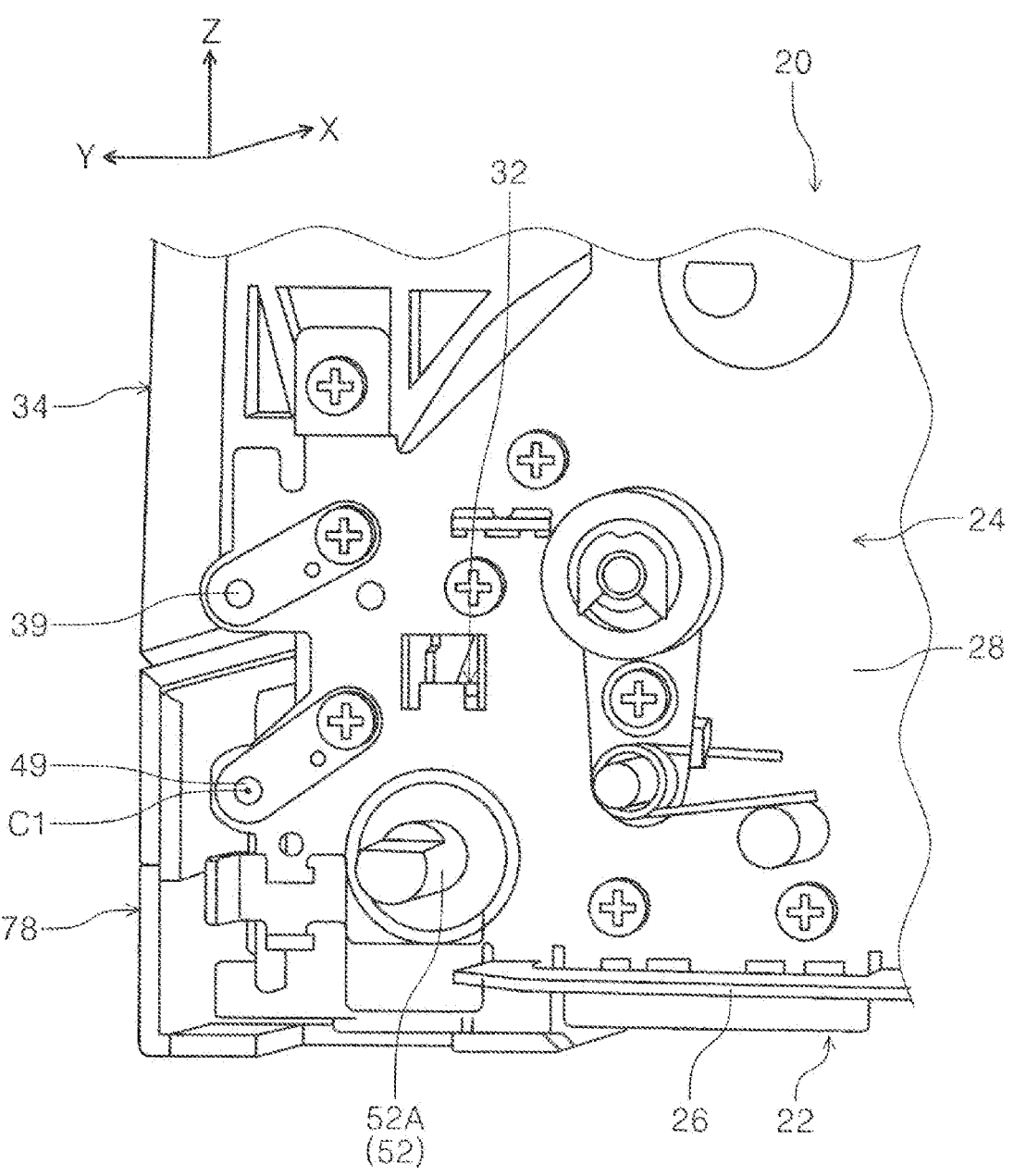
FIG. 5 is a perspective view showing a side plate of the document conveying device and each part provided on the side plate.

As shown in FIG. 5, the frame member 24 includes a bottom portion 26 extending along the XY plane, and plate-like side wall portions 28 standing upright in the Z direction at both end portions of the bottom portion 26 in the X direction.

The bottom portion 26 is provided with a mat 29 (FIG. 4) that presses the document G placed on the document table glass 15 (FIG. 4). The mat 29 is not provided at an end portion of the main body unit 22 in the +Y direction.

For example, the side wall portion 28 rotatably supports a first rotation shaft 86 and a third rotation shaft 42 (FIG. 6), which will be described later.

Further, the frame member 24 is provided with a limiting portion 32.

For example, the limiting portion 32 is formed by cutting and raising the side wall portions 28. In other words, the limiting portion 32 is a portion protruding from the frame member 24 toward a center in the X direction. When the roller support unit 102 (FIG. 4) described later is rotated in a direction in which the driven roller 54 described later is separated from the conveying roller 52, a protruding portion 93 (FIG. 6), which will be described later, comes into contact with the limiting portion 32, and thus the limiting portion 32 indirectly limits a rotation amount of the roller support unit 102. By limiting the rotation amount of the roller support unit 102, the limiting portion 32 limits a size of an interval of a part of the inversion path T (FIG. 4) to be equal to or less than a size corresponding to a thickness of the document G.

Figure 6:
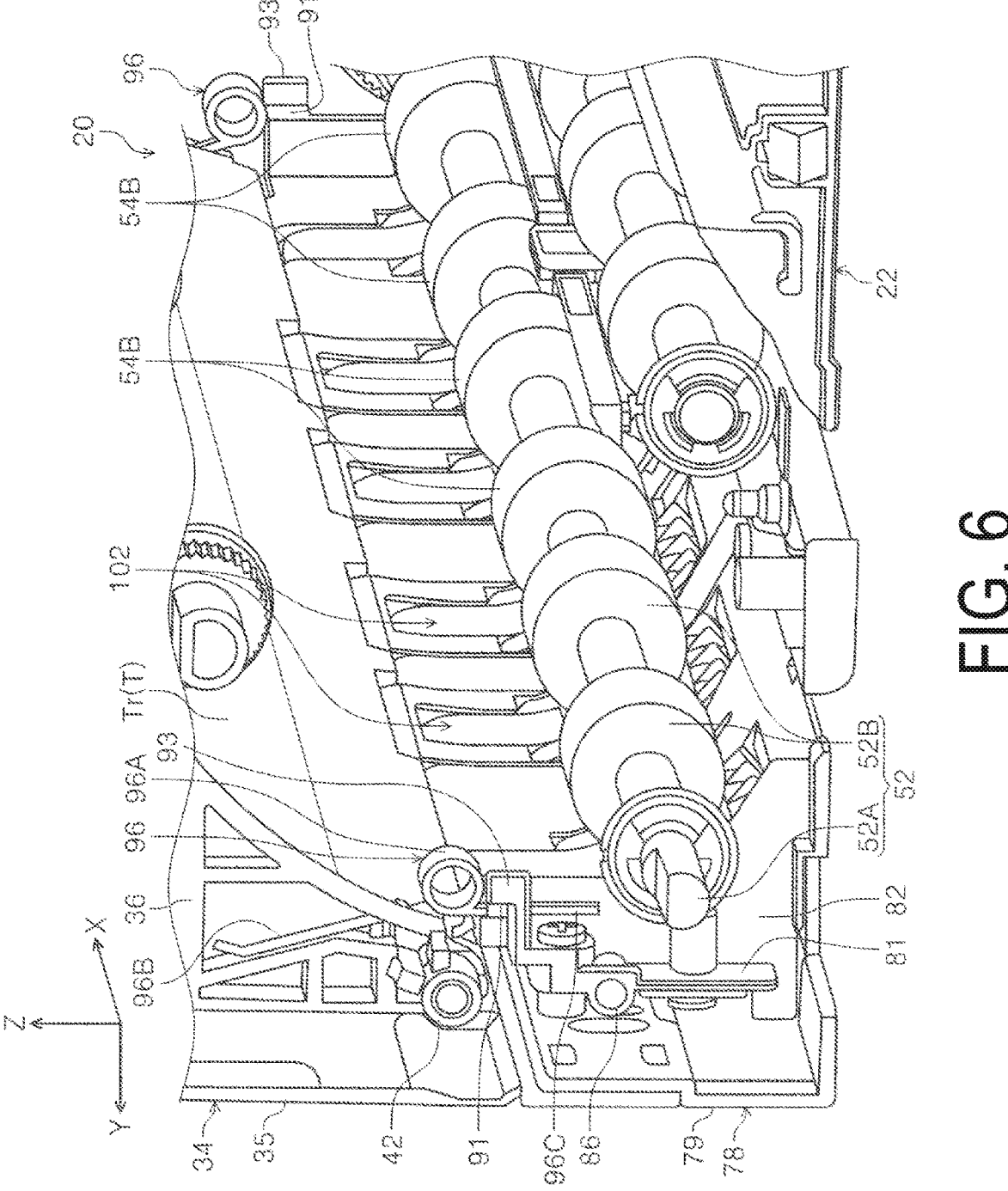
FIG. 6 is a perspective view showing a state in which a guide frame of the document conveying device is removed.

As shown in FIG. 6, the conveying roller 52 is an example of an inner roller provided in the main body unit 22 (FIG. 5) on an inner side of the inversion path T. The conveying roller 52 is driven by a motor (not shown) to convey the document G downstream in the conveying direction. For example, the conveying roller 52 includes a substantially cylindrical rotation shaft portion 52A extending in the X direction and a cylindrical elastic portion 52B having an outer diameter larger than that of the rotation shaft portion 52A. For example, six elastic portions 52B are provided at intervals in the X direction on the rotation shaft portion 52A.

Figure 10:
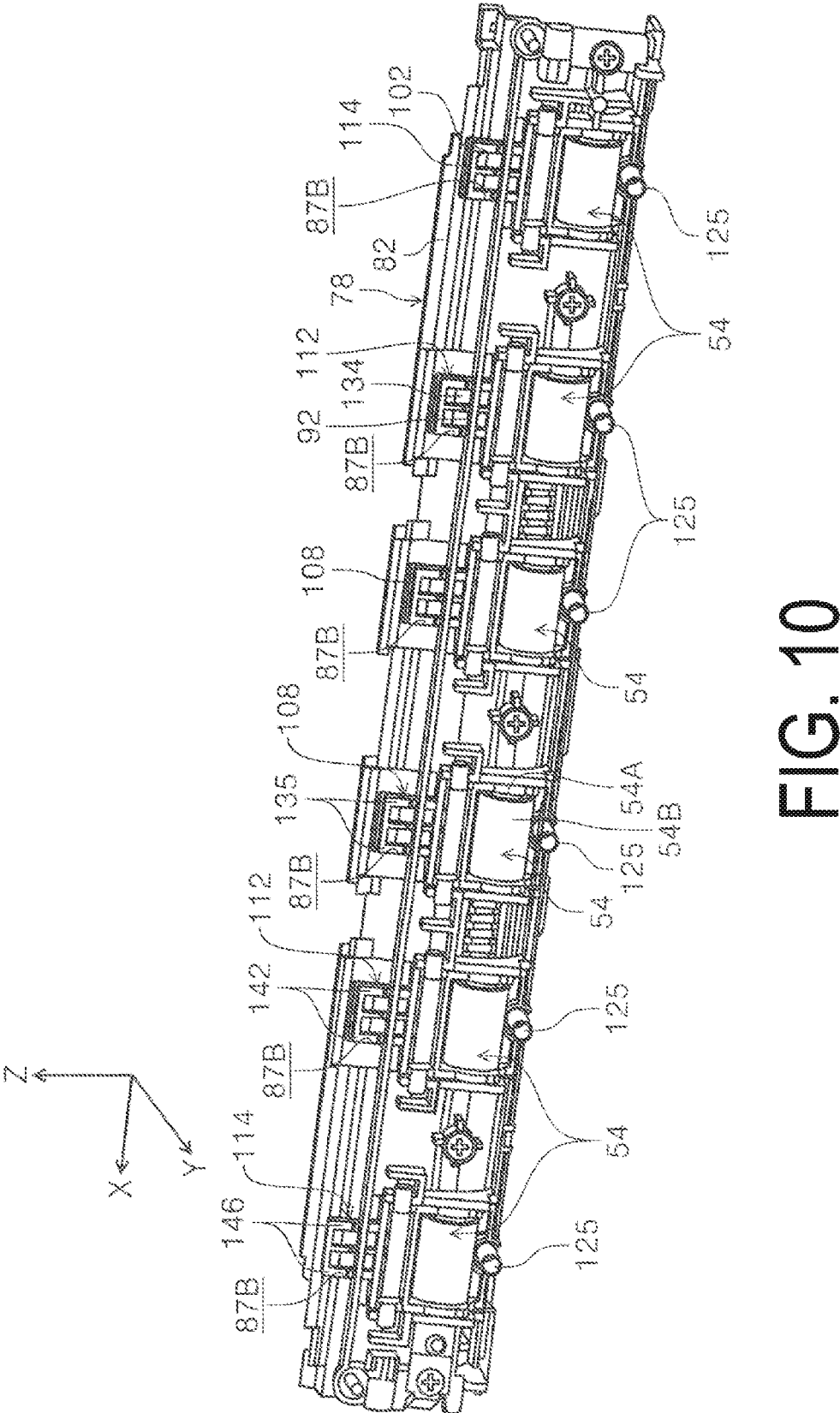
FIG. 10 is a perspective view showing the third unit, the support unit, and a driven roller.

As shown in FIG. 10, the driven roller 54 is an example of an outer roller provided in the roller support unit 102 described later on an outer side of the inversion path T. For example, six driven rollers 54 are disposed at intervals in the X direction. The driven roller 54 is positioned on the outer side in the arc portion Tr (FIG. 4). The driven roller 54 is rotated in accordance with rotation of the conveying roller 52 (FIG. 4), so that it can convey the document G. The driven roller 54 includes, for example, a cylindrical rotation shaft portion 54A extending in the X direction and a cylindrical portion 54B having an outer diameter larger than that of the rotation shaft portion 54A.

As shown in FIG. 6, the cover unit 34 is an example of a second unit and forms an outer side of the arc portion Tr. Specifically, the cover unit 34 includes a cover 35 having an L-shaped cross-section when viewed in the X direction, and a cover main body 36 provided inside the cover 35.

The cover main body 36 is formed of a member having a shape obtained by cutting out a part of a rectangular parallelepiped extending in the X direction in an arc shape. At both end portions of the cover main body 36 in the X direction, a cylindrical third rotation shaft 42 having a bottom opening toward an outer side in the X direction is provided.

The third rotation shaft 42 has an axial center extending in the X direction. The third rotation shaft 42 is rotatably supported by the main body unit 22 by inserting a pin 39 (FIG. 5) provided in the main body unit 22. In this way, the cover unit 34 is provided to be rotatable about the third rotation shaft 42.

As shown in FIGS. 1 and 2, the cover unit 34 may be set into a closed state in which the inversion path T (FIG. 2) is formed and an open state in which the inversion path T is open.

As shown in FIG. 2, the cover unit 34 is provided with a lock member 38 and a lock release lever 41. When the lock release lever 41 is pulled up, locking of the cover unit 34 in the closed state is released, and the cover unit 34 enters the open state.

The cover unit 34 is retracted with respect to the main body unit 22 to open a part of the inversion path T in the conveying direction of the document G in the +Z direction. As will be described later, the cover unit 34 can apply a pressing force to the roller support unit 102 (FIG. 4) in accordance with an opening operation of the cover unit 34.

As shown in FIG. 4, the cover unit 34 is provided with a pick roller 44 and a feed roller 46.

The pick roller 44 rotates to send out the document G placed on the document placing portion 23.

The feed roller 46 forms the separation roller pair 45 together with a separation roller 47 provided in the main body unit. A first roller pair 48 is provided downstream from the separation roller pair 45 in the inversion path T.

The first roller pair 48 includes a lower roller 48A driven by a motor (not shown) and an upper roller 48B that can be driven to rotate.

On a downstream side of the first roller pair 48 in the inversion path T, the document G is curved downward. A second roller pair 51 is provided downstream from the first roller pair 48.

The second roller pair 51 includes the conveying roller 52 and the driven roller 54 described above. The second roller pair 51 nips and conveys the document G at a position in the inversion path T at which a surface of the document G facing downward changes to face upward, that is, downstream from the endmost position in the +Y direction in the inversion path T.

The document G fed from the document placing portion 23 is curved downward by the inversion path T and then inverted in a direction opposite to the feeding direction from the document placing portion 23. The inverted document G passes through a region facing the first reading portion 16, which is being stopped, and reaches a third roller pair 56.

The third roller pair 56 includes a driving roller 56A driven by a motor (not shown) and a roller 56B that can be driven to rotate. The document G conveyed by the third roller pair 56 passes through a region facing the second reading portion 27 and reaches the discharge roller pair 58.

The discharge roller pair 58 includes a driving roller 58A driven by a motor (not shown) and a roller 58B that can be driven to rotate. The document G is discharged to the document discharge portion 25 by the discharge roller pair 58.

Figure 7:
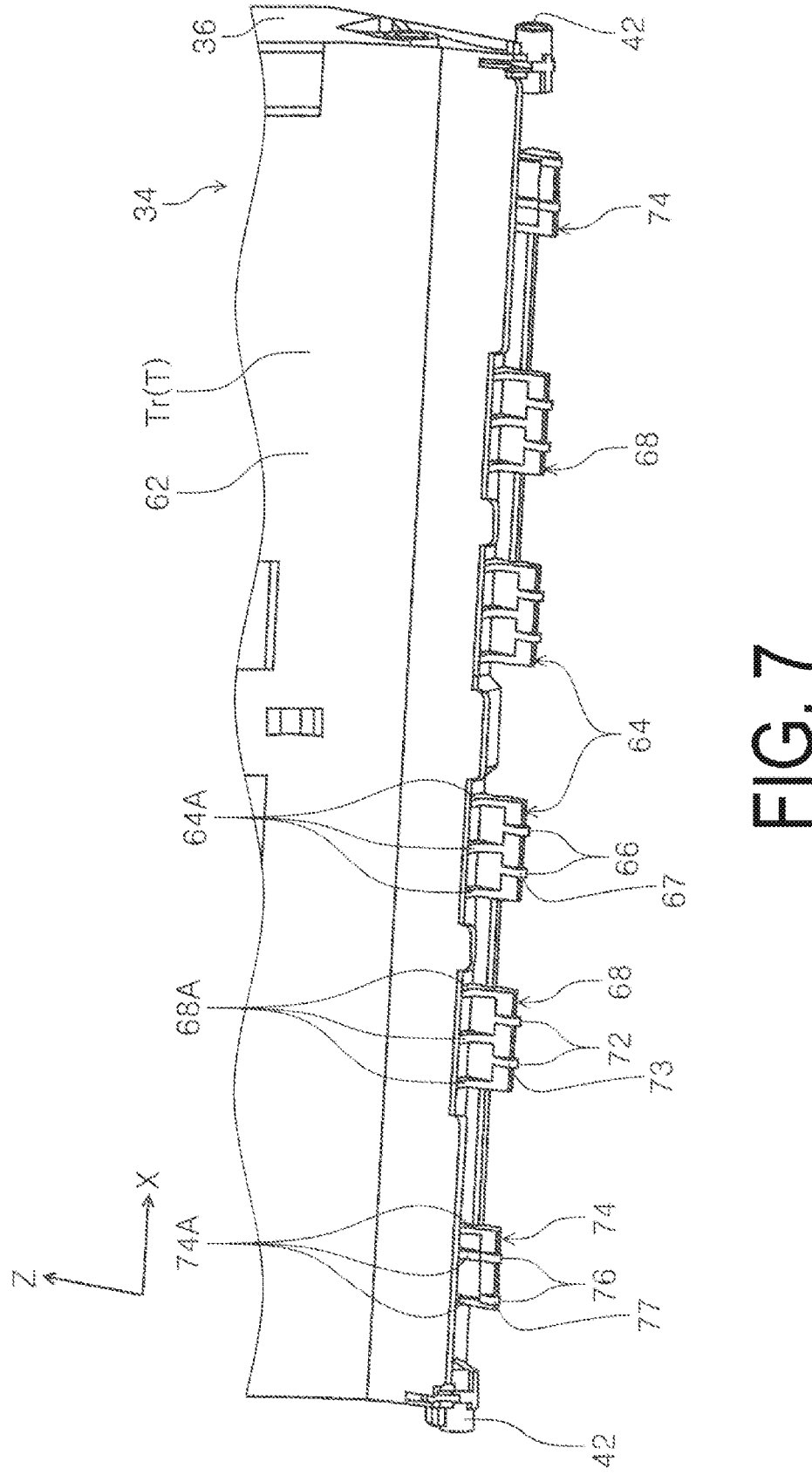
FIG. 7 is a perspective view showing an upper guide frame of the cover unit.

As shown in FIG. 7, the cover main body 36 has a curved surface 62 that forms a wall surface on an upper side and an outer side of the center of the inversion path T in the Z direction. Two sets of a first extending portion 64 and two sets of second extending portions 68 and 74 are provided at an end portion of the cover main body 36 in the −Z direction.

The two sets of the first extending portion 64 and the second extending portions 68 and 74 are positioned symmetrically in the +X direction and the −X direction with respect to a center of the cover main body 36 in the X direction. In addition, the two sets of the first extending portion 64 and the second extending portions 68 and 74 extend in the −Z direction from portions of the cover main body 36 located at positions in the +Y direction and the −Z direction with respect to the curved surface 62. Also, positions of each part of the cover main body 36 will be described assuming that the cover unit 34 is in the closed state.

The first extending portion 64 is a plate-shaped portion extending in the −Z direction from the cover main body 36. The first extending portion 64 is positioned on the center side of the cover main body 36 in the X direction. For example, the first extending portion 64 is reinforced by three ribs 64A positioned at intervals in the X direction. Two first contact portions 66 that can come into contact with the roller support unit 102 (FIG. 4), which will be described later, are provided at an end portion of the first extending portion 64 in the −Z direction.

The first contact portion 66 is a protruding portion protruding in the −Z direction from the end portion of the first extending portion 64 in the −Z direction. The first contact portion 66 has, for example, a curved first contact surface 67.

The first contact surface 67 is a surface that comes into contact with a first contacted portion 135 (FIG. 10), which will be described later, when the cover unit 34 is rotated to be in the open state.

The second extending portion 68 is a plate-shaped portion extending in the −Z direction from the cover main body 36. The second extending portion 68 is positioned on an outer side of the first extending portion 64 in the X direction. For example, the second extending portion 68 is reinforced by three ribs 68A positioned at intervals in the X direction. Two second contact portions 72 that can come into contact with the roller support unit 102 (FIG. 4) described later are provided at an end portion of the second extending portion 68 in the −Z direction.

The second contact portion 72 is a protruding portion protruding in the −Z direction from the end portion of the second extending portion 68 in the −Z direction. The second contact portion 72 has, for example, a curved second contact surface 73.

The second contact surface 73 is a surface that comes into contact with a second contacted portion 142 (FIG. 10), which will be described later, when the cover unit 34 is rotated to be in the open state.

The second extending portion 74 is a plate-shaped portion extending in the −Z direction from the cover main body 36. The second extending portion 74 is positioned on an outer side of the second extending portion 68 in the X direction.

For example, the second extending portion 74 is reinforced by three ribs 74A positioned at intervals in the X direction. Two second contact portions 76 that can come into contact with the roller support unit 102 (FIG. 4) described later are provided at an end portion of the second extending portion 74 in the −Z direction.

The second contact portion 76 is a protruding portion protruding in the −Z direction from the end portion of the second extending portion 74 in the −Z direction. The second contact portion 76 has, for example, a curved second contact surface 77.

The second contact surface 77 is a surface that comes into contact with a second contacted portion 146 (FIG. 10), which will be described later, when the cover unit 34 is rotated to be in the open state.

Figure 8:
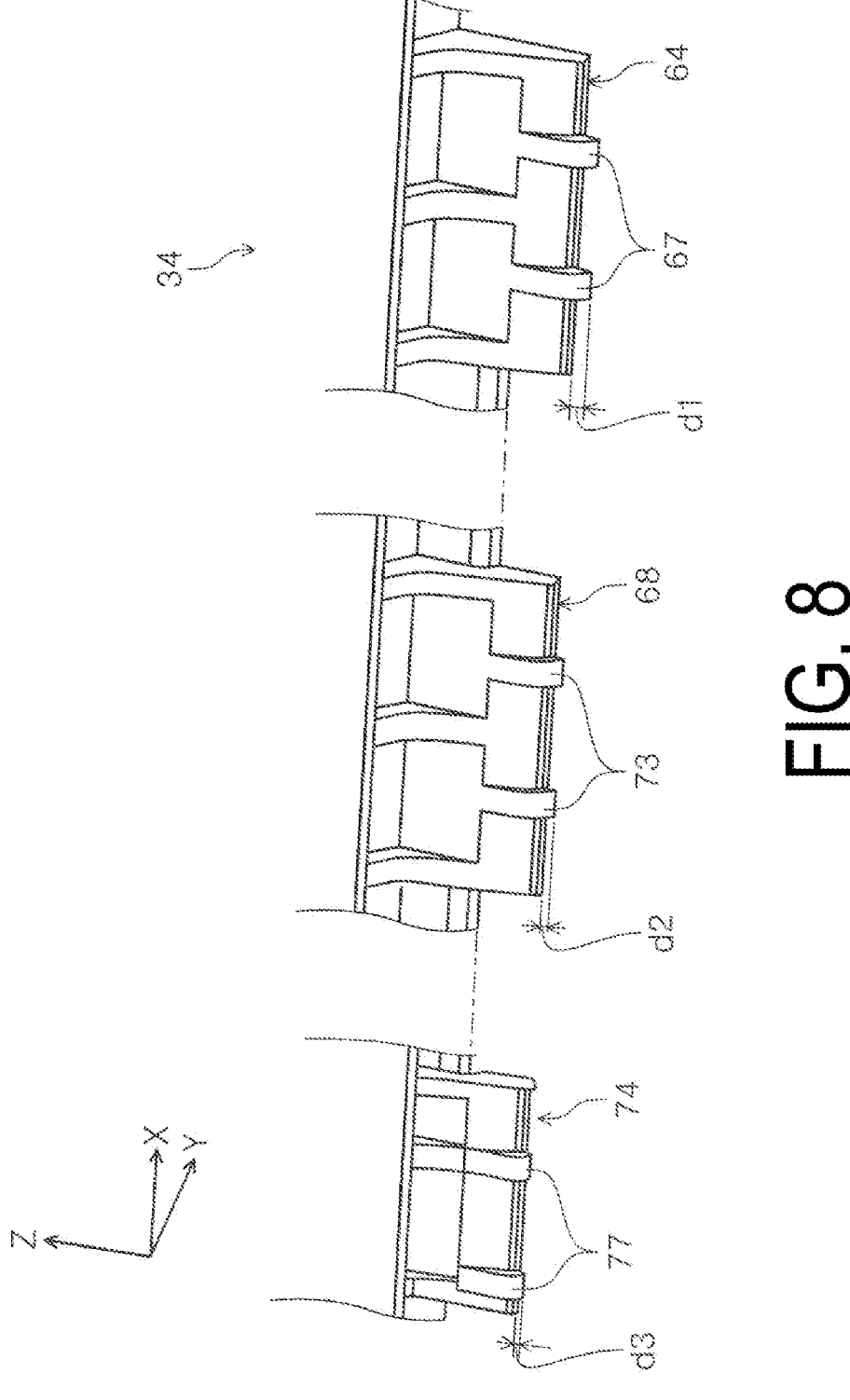
FIG. 8 is an enlarged perspective view of contact portions of the cover unit.

As shown in FIG. 8, in the −Y direction that is an example of a moving direction in which the cover unit 34 comes closer to inner units 108, middle units 112, and outer units 114 (FIG. 10), which will be described later, a part of the first contact surface 67 is located downstream from a part of each of the second contact surfaces 73 and 77. The second contact surface 73 is located downstream from the second contact surface 77 in the −Y direction of the cover unit 34. In other words, when an amount of protrusion of the first contact surface 67 from the first extending portion 64 is defined as d1 [mm], an amount of protrusion of the second contact surface 73 from the second extending portion 68 is defined as d2 [mm], and an amount of protrusion of the second contact surface 77 from the second extending portion 74 is defined as d3 [mm], d1>d2>d3, for example.

As shown in FIG. 6, the movable unit 78 is an example of a third unit and is positioned in the −Z direction with respect to the cover unit 34. The movable unit 78 forms an outer side of the arc portion Tr downstream from the cover unit 34 in the conveying direction of the document G. The movable unit 78 is provided rotatably about the first rotation shaft 86 to be movable closer to and away from the main body unit 22. The movable unit 78 is rotatable in a direction in which it retracts with respect to the main body unit 22 by receiving a force from the roller support unit 102, which will be described later.

Specifically, the movable unit 78 is configured to include an outer cover 79 having an L-shaped cross-section when viewed in the X direction, an inner cover 81 provided inside the outer cover 79, and a main body portion 82 partially covered with the inner cover 81 when viewed in the −Y direction.

Figure 12:
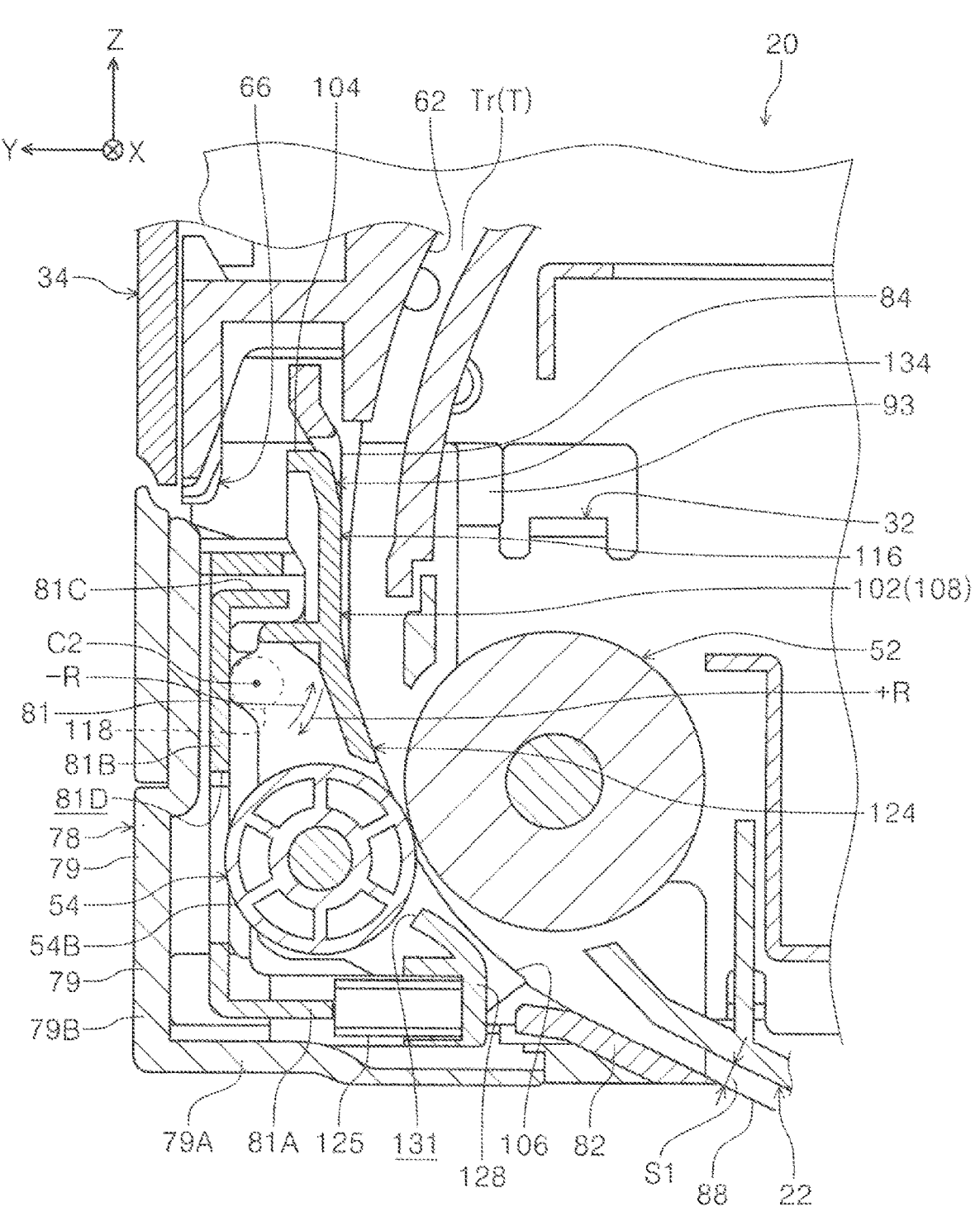
FIG. 12 is a vertical cross-sectional view of a part of the document conveying device in a state in which both the document conveying device and the cover unit are closed.

As shown in FIG. 12, for example, a material of the outer cover 79 is a resin, and the outer cover 79 is attached to an end portion of the main body portion 82, which will be described later, in the +Y direction. The outer cover 79 includes a plate-shaped bottom wall 79A having a predetermined thickness in the Z direction and a vertical wall 79B standing upright in the +Z direction at an end portion of the bottom wall 79A in the +Y direction.

For example, a material of the inner cover 81 is a metal, and the inner cover 81 is attached to the main body portion 82. The inner cover 81 has a bottom plate portion 81A having a predetermined thickness in the Z direction, a vertical plate portion 81B standing upright in the +Z direction at an end portion of the bottom plate portion 81A in the +Y direction, and an upper plate portion 81C extending in the −Y direction from an end portion of the vertical plate portion 81B in the +Z direction. A window portion 81D penetrating the vertical plate portion 81B in the Y direction is formed therein.

The cylindrical portion 54B of the driven roller 54 is exposed in the +Y direction from the window portion 81D.

As shown in FIG. 6, the main body portion 82 is formed of a member having a shape in which a part of a rectangular parallelepiped extending in the X direction is cut off in an arc shape. At both end portions of the main body portion 82 in the X direction, the cylindrical and bottomed first rotation shaft 86 that opens outward in the X direction is provided.

The first rotation shaft 86 has an axial center extending in the X direction. The first rotation shaft 86 is rotatably supported by the main body unit 22 by inserting a pin 49 (FIG. 5) provided in the main body unit 22. Thus, the movable unit 78 is provided to be rotatable about the first rotation shaft 86. For example, the first rotation shaft 86 is aligned with the third rotation shaft 42 in the Z direction and is located in the −Z direction with respect to the third rotation shaft 42.

For example, a vertical wall portion 91 and a protruding portion 93 are provided at each of both end portions of the main body portion 82 in the X direction.

The vertical wall portion 91 protrudes outward in the X direction at a position located in the −Y direction and the +Z direction with respect to the first rotation shaft 86 in the main body portion 82. The vertical wall portion 91 is formed in a plate shape having a predetermined thickness in the Y direction.

The protruding portion 93 is a portion that protrudes in the −Y direction from an outer end portion of the vertical wall portion 91 in the X direction. The protruding portion 93 is formed in a plate shape having a predetermined thickness in the X direction. When the movable unit 78 is rotated, the protruding portion 93 comes into contact with the limiting portion 32 (FIG. 5) to limit movement of the protruding portion 93.

Figure 9:
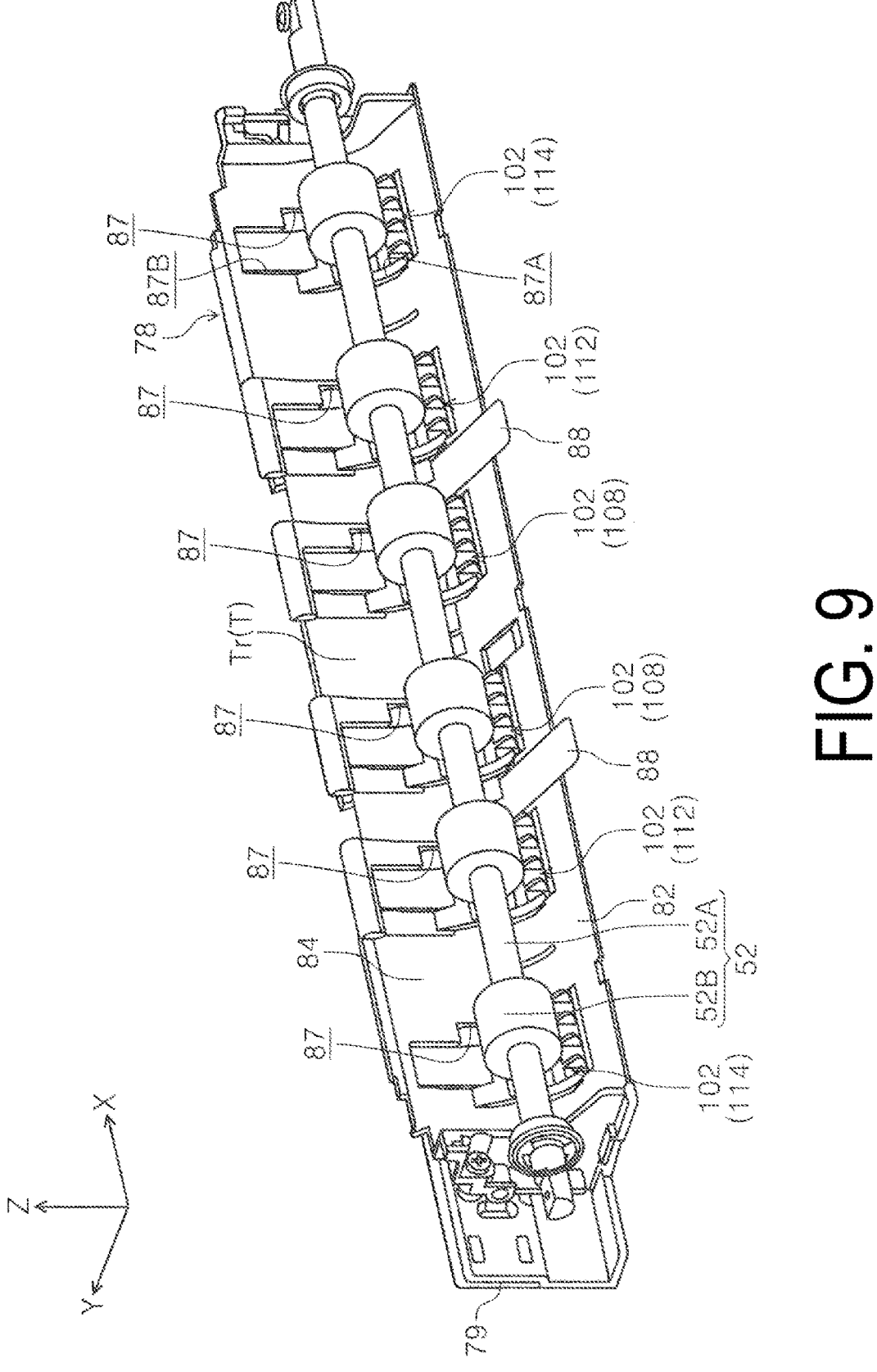
FIG. 9 is a perspective view showing a third unit, a support unit, and a conveying roller.

As shown in FIG. 9, the main body portion 82 of the movable unit 78 has a path surface 84 that forms a part of the inversion path T. Also, for example, six hole portions 87 are formed in the main body portion 82 at intervals in the X direction.

For example, the path surface 84 is a curved surface and forms a part of the arc portion Tr.

Each of the six hole portions 87 penetrates the main body portion 82 in a direction intersecting the path surface 84. One roller support unit 102, which will be described later, is accommodated in each of the six hole portions 87. When viewed in the penetrating direction, the hole portion 87 includes a wide portion 87A that is wide in the X direction and a narrow portion 87B that is positioned in the +Z direction with respect to the wide portion 87A and is narrower in the X direction than the wide portion 87A.

For example, two sheet members 88 are provided at portions of the path surface 84 located between the adjacent hole portions 87.

The sheet member 88 extends from a portion located between adjacent hole portions 87, in other words, between adjacent roller support units 102 downstream from the movable unit 78 in the conveying direction. That is, one end portion of the sheet member 88 extends downstream from the main body portion 82 in the conveying direction. In this embodiment, for example, two sheet members 88 are provided at an interval in the X direction. Specifically, they are provided between the inner units 108 and the middle units 112, which will be described later.

As shown in FIG. 10, a regulating portion 92 is provided at an end portion of the main body portion 82 in the +Y direction which is a portion on the back side thereof.

The regulating portion 92 is positioned in the +Y direction with respect to the narrow portion 87B. Also, the regulating portion 92 extends linearly in the X direction to straddle across the six narrow portions 87B. For example, the regulating portion 92 is a plate-shaped portion having a predetermined thickness in the Z direction. When a second extension portion 134 of the roller support unit 102, which will be described later, comes into contact with the regulating portion 92, the regulating portion 92 regulates the second extension portion 134 from moving in the +Y direction more than necessary.

Figure 11:
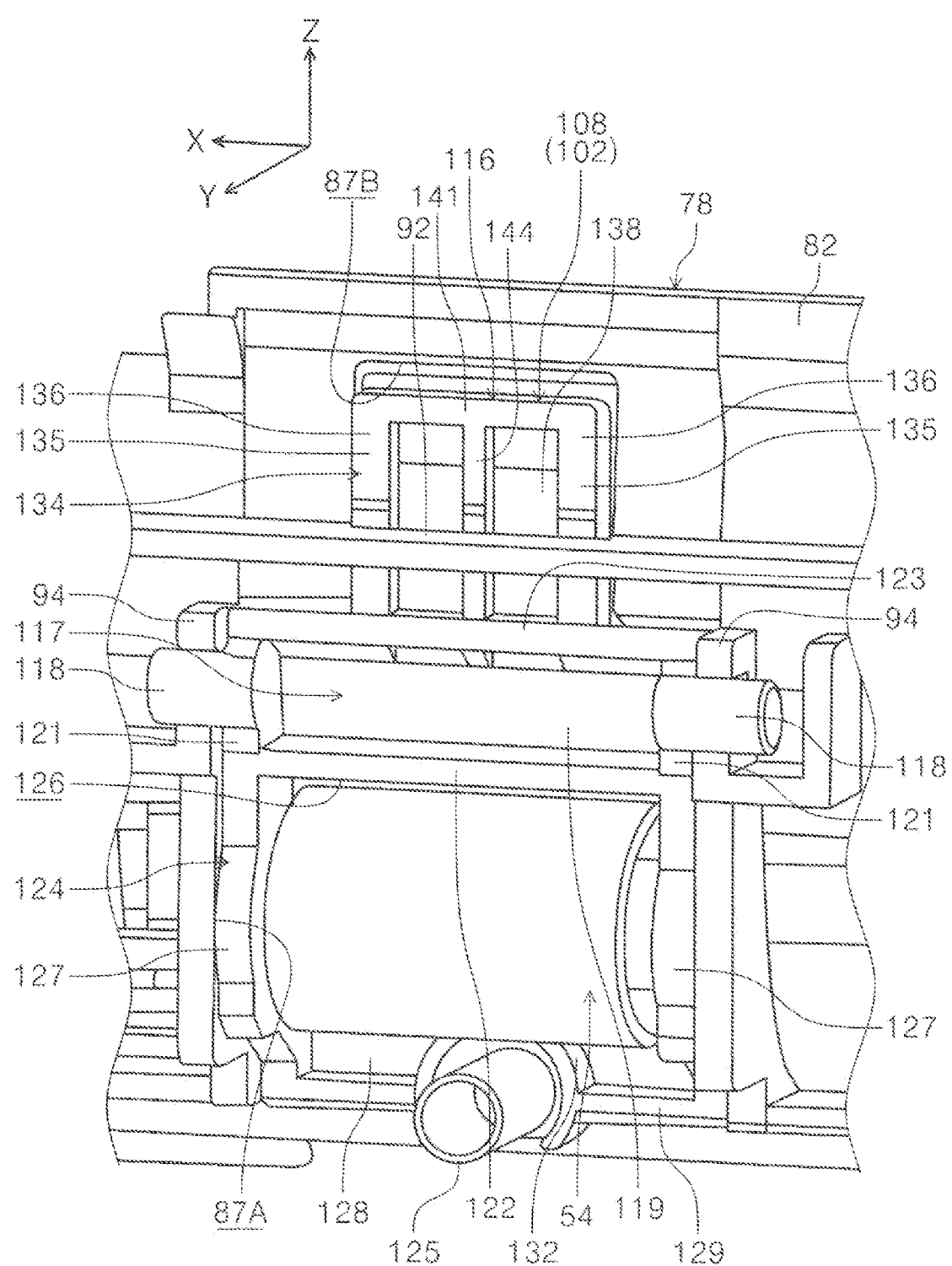
FIG. 11 is an enlarged perspective view of the third unit, the support unit, and the driven roller.

As shown in FIG. 11, bearing portions 94 are provided at positions in the −Z direction with respect to the regulating portion 92 in the main body portion 82 and at both edge portions of the wide portion 87A in the X direction.

The bearing portions 94 are portions cut out in a C shape opening in the +Y direction when viewed in the X direction and rotatably support a second rotation shaft 118, which will be described later.

As shown in FIG. 6, for example, two torsion springs 96 are provided at both end portions of the document conveying device 20 in the X direction.

Each of the torsion springs 96 includes a winding portion 96A, a linear portion 96B extending from the winding portion 96A to one side, and a linear portion 96C extending from the winding portion 96A to the other side.

The linear portions 96B come into contact with both end portions of the cover unit 34 in the X direction in the +Y direction. The linear portions 96C come into contact with a side surface in the +Y direction of the vertical wall portion 91 of the movable unit 78.

The two torsion springs 96 apply a pressing force, which is an elastic force, to the movable unit 78 and the cover unit 34 regardless of the open state and the closed state of the cover unit 34.

A pressing force acting on the movable unit 78 from the two torsion springs 96 in the closed state of the cover unit 34 is referred to as a first pressing force F1 [N]. A pressing force acting on the movable unit 78 from the two torsion springs 96 in the open state of the cover unit 34 is referred to as a second pressing force F2 [N]. Here, the first pressing force F1 is greater than the second pressing force F2. The pressing force is realized by the pressing force of the torsion springs 96 and an elastic force of a coil spring 125, which will be described later. In addition, illustration of the first pressing force F1 and the second pressing force F2 is omitted.

As shown in FIG. 10, the roller support unit 102 is an example of a support unit that rotatably supports the driven roller 54. For example, the roller support unit 102 is configured by two inner units 108 positioned on the center side in the X direction, two middle units 112 positioned on outer sides in the X direction with respect to the inner units 108, and two outer units 114 positioned on outer sides in the X direction with respect to the middle units 112. That is, the inner units 108, the middle units 112, and the outer units 114 are positioned outward from the center in the X direction in order in the +X direction and the −X direction.

The inner unit 108 is an example of a first support unit. The middle unit 112 and the outer unit 114 are examples of a second support unit. Also, regarding the middle unit 112 and the outer unit 114, the middle unit 112 may be regarded as an example of the first support unit, and the outer unit 114 may be regarded as an example of a second support unit.

In this embodiment, for example, the inner unit 108, middle unit 112, and the outer unit 114 are configured to have the same shape and the same size. For this reason, in the following description, when a specific configuration of the roller support unit 102 is described, the inner unit 108 is described as an example, and description of the middle unit 112 and the outer unit 114 may be omitted. In addition, the inner unit 108 may be simply described as the roller support unit 102.

The inner unit 108 includes the first contacted portion 135. The first contact portion 66 (FIG. 7) is contactable with the first contacted portion 135.

The middle unit 112 includes the second contacted portion 142 instead of the first contacted portion 135 in the inner unit 108. The second contact portion 72 (FIG. 7) is contactable with the second contacted portion 142.

The outer unit 114 includes the second contacted portion 146 instead of the first contacted portion 135 in the inner unit 108. The second contact portion 76 (FIG. 7) is contactable with the second contacted portion 146.

FIG. 11 is an enlarged diagram of the inner unit 108 serving as an example of the roller support unit 102. The inner unit 108 includes a swing member 116.

The swing member 116 rotatably supports the driven roller 54. The swing member 116 is provided to be rotatable about the second rotation shaft 118.

The swing member 116 forms an outer side of the arc portion Tr (FIG. 4) of the inversion path T. By receiving a force from the cover unit 34 (FIG. 4), the swing member 116 is rotatable about the second rotation shaft 118 in a direction in which the driven roller 54 moves away from the conveying roller 52 (FIG. 4).

When viewed in the X direction, the swing member 116 includes the second rotation shaft 118 supported by a base portion 117, a first extension portion 124 extending from the second rotation shaft 118 in the −Z direction as one side and supporting the driven roller 54, and the second extension portion 134 extending from the second rotation shaft 118 in the +Z direction as the other side and contactable with the cover unit 34 (FIG. 4).

The base portion 117 includes, for example, a first guide wall 119, two first side walls 121, a first lower wall 122, and a first upper wall 123. The base portion 117 is formed in a box shape having the first guide wall 119 as a bottom portion and opening in the +Y direction.

The first guide wall 119 is a rectangular wall whose dimension in the X direction is longer than its dimension in the Z direction, and forms a part of the outer side of the inversion path T (FIG. 4).

The two first side walls 121 stand upright in the +Y direction from both end portions of the first guide wall 119 in the X direction. The first lower wall 122 stands upright in the +Y direction from an end portion of the first guide wall 119 in the −Z direction. The first upper wall 123 stands upright in the +Y direction from an end portion of the first guide wall 119 in the +Z direction.

The second rotation shaft 118 is a cylindrical portion having an axial center in the X direction. The second rotation shaft 118 extends outward in the X direction from each of the two first side walls 121. As described above, the second rotation shaft 118 is rotatably supported by the bearing portions 94.

The first extension portion 124 includes, for example, two second side walls 127, a second guide wall 128, and a second lower wall 129.

The two second side walls 127 are walls extending in the −Z direction from end portions of the two first side walls 121 in the −Z direction. The two second side walls 127 rotatably support both end portions of the driven roller 54 in the X direction.

The second guide wall 128 is a rectangular wall whose dimension in the X direction is longer than its dimension in the Z direction and forms a part of the outer side of the inversion path T (FIG. 4). The second guide wall 128 connects end portions in the −Y direction of end portions in the −Z direction of the two second side walls 127 to each other in the X direction. The second guide wall 128 is positioned in the −Z direction with respect to the first guide wall 119. In other words, the second guide wall 128 is located downstream from the first guide wall 119 in the conveying direction of the document G. A portion between the first guide wall 119 and the second guide wall 128 is an opening portion 131 (FIG. 12). The driven roller 54 is exposed to the inversion path T through the opening portion 131.

The second lower wall 129 connects end portions of the two second side walls 127 in the −Z direction to an end portion of the second guide wall 128 in the −Z direction. A protection portion 132 is provided on the second lower wall 129 and the second guide wall 128.

The protection portion 132 is a semi-cylindrical portion extending in the Y direction and opening in the +Y direction and the −Z direction. The coil spring 125, which will be described later, is positioned inside the protection portion 132.

The first extension portion 124 and the first lower wall 122 form a housing portion 126. The housing portion 126 is a space portion in which the driven roller 54 is housed.

The second extension portion 134 includes, for example, two third side walls 136, a third guide wall 138, a second upper wall 141, and a rib 144. For example, a length of the second extension portion 134 in the Z direction is shorter than a length of the first extension portion 124 in the Z direction. A width of the second extension portion 134 in the X direction is narrower than a width of the first extension portion 124 in the X direction.

The two third side walls 136 are walls extending in the +Z direction from the first upper wall 123.

The third guide wall 138 connects the two third side walls 136 to each other in the X direction and forms a part of the outer side of the inversion path T (FIG. 4). The third guide wall 138 is positioned in the +Z direction with respect to the first guide wall 119. In other words, the third guide wall 138 is located upstream from the first guide wall 119 in the conveying direction of the document G.

The second upper wall 141 connects end portions of the two third side walls 136 in the +Z direction to each other in the X direction.

The rib 144 protrudes in the +Y direction from the third guide wall 138 between the two third side walls 136 and reinforces the second extension portion 134.

The second extension portion 134 is contactable with the cover unit 34 (FIG. 4). Specifically, the first contacted portions 135 are provided at an end portion of the second extension portion 134 in the +Z direction.

The first contacted portions 135 are configured by portions located in the +Z direction from centers of the two third side walls 136 in the Z direction. In the closed state of the cover unit 34, end surfaces of the first contacted portions 135 in the +Y direction are disposed along the XZ plane, for example.

A portion of the second extension portion 134 located in the −Z direction from the first contacted portions 135 is located at a position at which it can contact the regulating portion 92.

As shown in FIG. 12, when the second extension portion 134 receives a pressing force in the −Y direction from the first contact portion 66, the second extension portion 134 is moved toward the conveying roller 52. Then, the first extension portion 124 is moved in a direction in which the driven roller 54 moves away from the conveying roller 52. That is, the swing member 116 is rotated in the +R direction.

When the first contact portion 66 is retracted in the +Y direction with respect to the second extension portion 134, the second extension portion 134 is moved away from the conveying roller 52 by actions of the torsion springs 96 (FIG. 6) and the coil spring 125 described later. Then, the first extension portion 124 is moved in a direction in which the driven roller 54 comes closer to the conveying roller 52. That is, the swing member 116 is rotated in the –R direction.

The inner unit 108 includes the coil spring 125 serving as an example of an elastic member.

The coil spring 125 is held in the Y direction between the second guide wall 128 of the first extension portion 124 and the bottom plate portion 81A of the movable unit 78. In a state in which the cover unit 34 forms the outer side of the inversion path T, that is, in the closed state of the cover unit 34, the coil spring 125 applies an elastic force to the roller support unit 102 so that the driven roller 54 comes closer to the conveying roller 52.

When viewed in the X direction, the center of the second rotation shaft 118 is defined as a rotation center C2. In this embodiment, when viewed in the X direction, a position of a rotation center C1 (FIG. 5) of the movable unit 78 and a position of the rotation center C2 of the swing member 116 substantially coincide with each other.

When the cover unit 34 is in the closed state, in other words, when the document G is conveyed along the inversion path T, an upstream end portion 104 of the roller support unit 102 in the conveying direction is located farther from the main body unit 22 than the path surface 84 that forms the inversion path T of the movable unit 78. When the document G is conveyed along the inversion path T, a downstream end portion 106 of the roller support unit 102 in the conveying direction is located closer to the main body unit 22 than the path surface 84. In other words, the downstream end portion 106 protrudes closer to the inversion path T than the path surface 84.

As shown in FIG. 4, a state in which the device main body portion 21 closes the upper surface 14 of the lower device 12 and the cover unit 34 forms the inversion path T is referred to as a first setting state of the document conveying device 20.

Also, a state in which the device main body portion 21 closes the upper surface 14 of the lower device 12 and the cover unit 34 opens the inversion path T is referred to as a second setting state of the document conveying device 20.

Further, a state in which the device main body portion 21 opens the upper surface 14 of the lower device 12 and the cover unit 34 opens the inversion path T is referred to as a third setting state of the document conveying device 20.

An interval of the inversion path T formed by the main body unit 22 and the movable unit 78 is represented by S [mm]. In this embodiment, for example, the interval S [mm] is set at a position downstream from the nip forming position formed by the conveying roller 52 and the driven roller 54 and corresponding to a downstream end portion of the movable unit 78.

Also, the interval S in the first setting state is defined as a first interval S1 [mm], the interval S in the second setting state is defined as a second interval S2 [mm], and the interval S in the third setting state is defined as a third interval S3 [mm].

Figure 13:
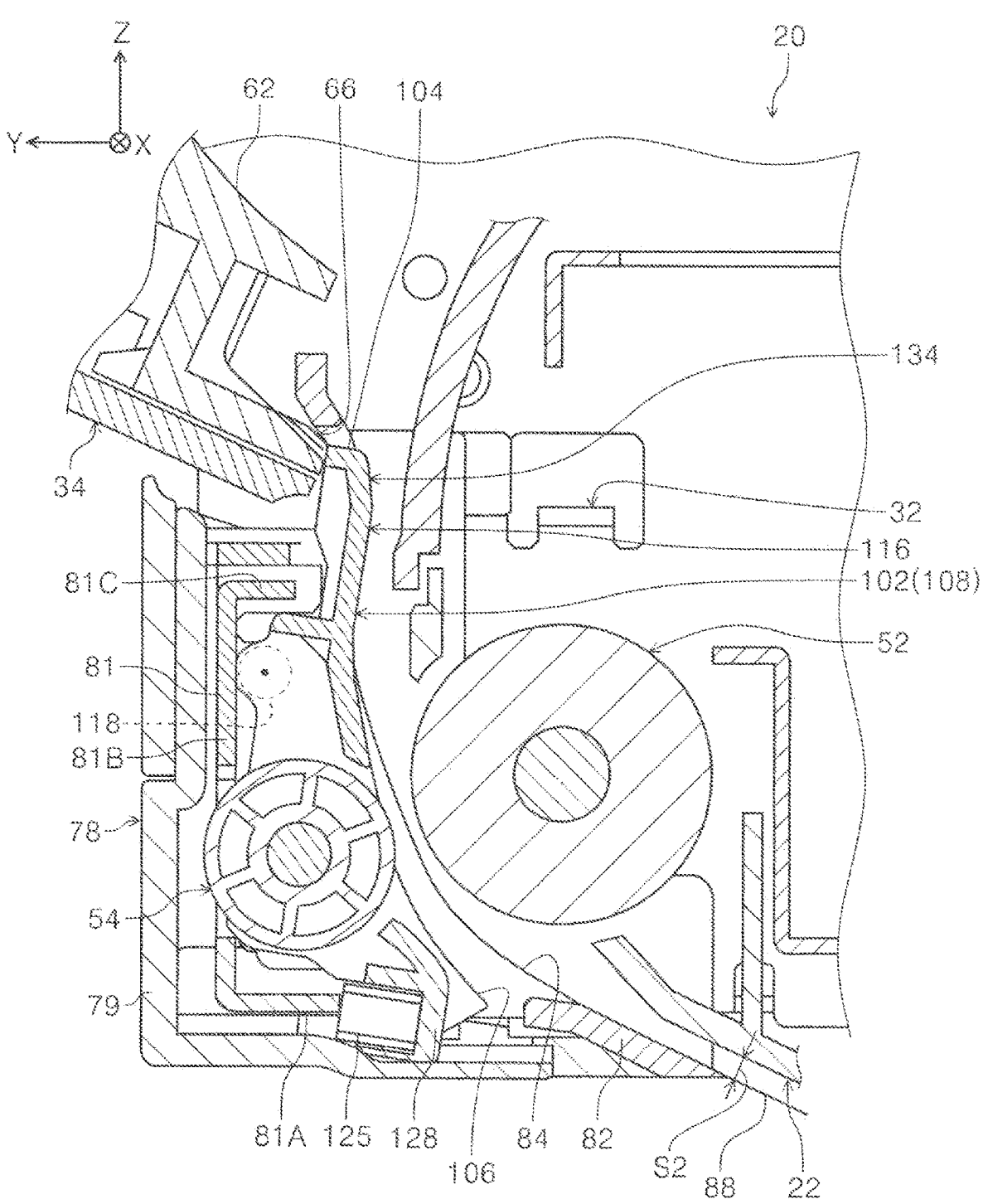
FIG. 13 is a vertical cross-sectional view of a part of the document conveying device in a state in which the document conveying device is closed and the cover unit is open.
Figure 14:
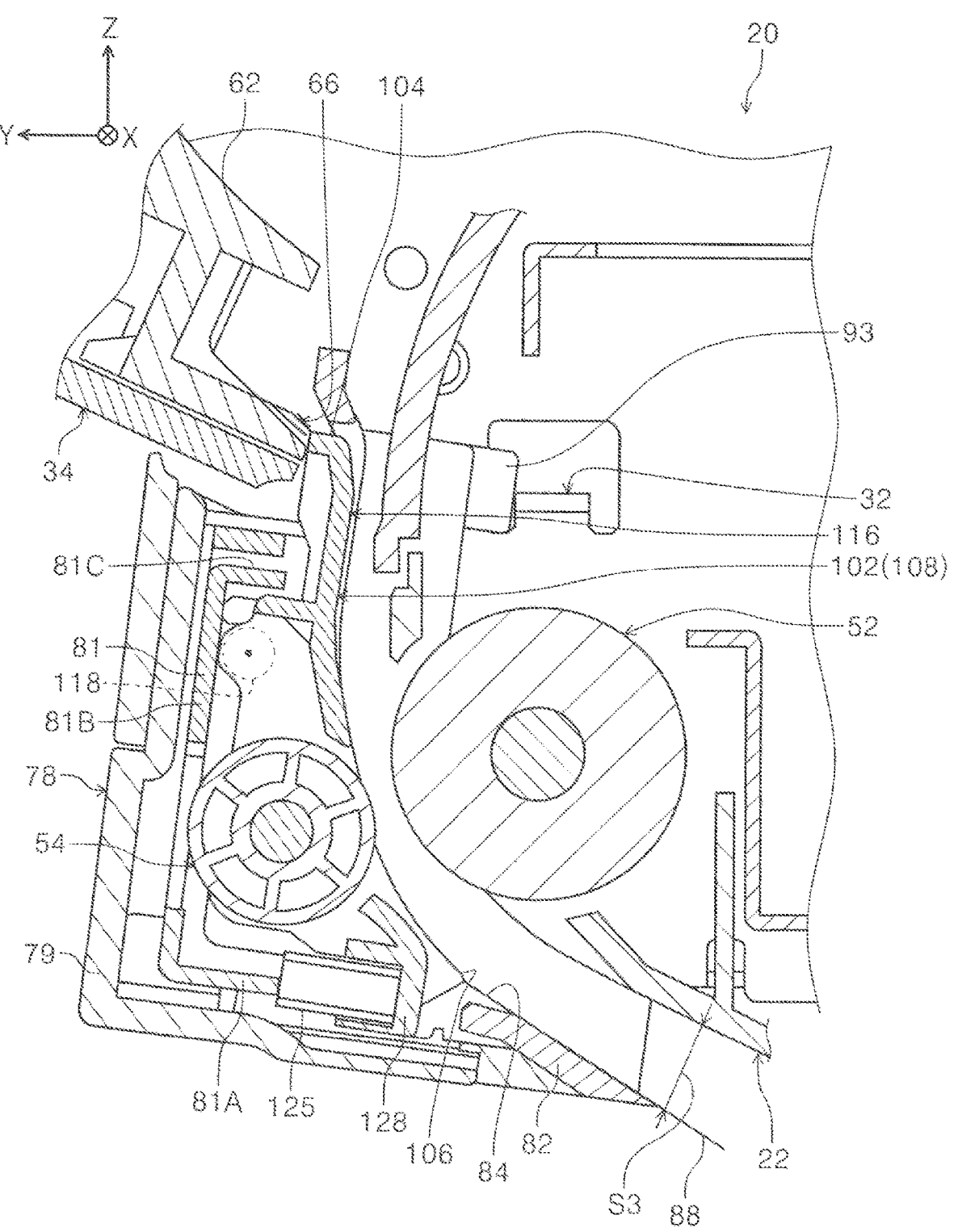
FIG. 14 is a vertical cross-sectional view of a part of the document conveying device in a state in which both the document conveying device and the cover unit are open.

As shown in FIGS. 12, 13, and 14, the document conveying device 20 is configured such that the second interval S2 in the second setting state is wider than the first interval S1 in the first setting state. Further, the document conveying device 20 is configured such that the third interval S3 in the third setting state is wider than the second interval S2.

A difference between the third interval S3 and the second interval S2 is greater than a difference between the second interval S2 and the first interval S1.

Next, operations of the scanner 10 will be described. Also, FIGS. 1 to 14 will be referred to for each part and each member forming the scanner 10, and description of individual numbers of the figures will be omitted.

When the cover unit 34 is open from the closed state, the first contact portion 66 and the first contacted portion 135, the second contact portion 72 and the second contacted portion 142, and the second contact portion 76 and the second contacted portion 146 come into contact with each other. Then, the roller support unit 102 is rotated in the +R direction about the second rotation shaft 118. Thus, the second extension portion 134 of the roller support unit 102 is separated from the conveying roller 52, and the driven roller 54 is separated from the conveying roller 52. In this case, the coil spring 125 receives a pressing force including a component in the +Y direction from the second extension portion 134, and thereby causes a pressing force including a component in the +Y direction to act on the inner cover 81 of the movable unit 78. Further, an angle formed by the linear portion 96B and the linear portion 96C of the torsion spring 96, that is, its opening angle changes.

Further, when the cover unit 34 is open from the closed state, the change in the opening angle of the torsion spring 96 acts such that a spring force becomes weaker than a spring force when the cover unit 34 is in the closed state. Thus, the pressing force including the component in the +Y direction applied from the torsion spring 96 to the end portion of the movable unit 78 in the +Z direction is weakened.

Here, since a reaction force received from the coil spring 125 is larger than the pressing force acting from the torsion spring 96, the movable unit 78 is rotated in a direction away from the conveying roller 52. In this way, the interval between the conveying roller 52 and the driven roller 54 is widened. In addition, on a downstream side of the conveying roller 52 and the driven roller 54 in the inversion path T, an interval of the inversion path T corresponding to the interval between the main body unit 22 and the movable unit 78 increases.

When the document conveying device 20 is open with respect to the lower device 12 in the open state of the cover unit 34, regulation of the rotation of the movable unit 78 due to the lower device 12 is released, and thus the movable unit 78 is further rotated. Thus, the interval of the inversion path T is further widened.

On the other hand, when the cover unit 34 is closed from the open state, the first contact portion 66, the second contact portion 72, and the second contact portion 76 are separated from the first contacted portion 135, the second contacted portion 142, and the second contacted portion 146. Thus, the pressing force for rotating the roller support unit 102 in the +R direction is weakened, and the pressing force including the component in the +Y direction applied to the inner cover 81 of the movable unit 78 by the coil spring 125 is weakened.

Further, when the cover unit 34 is closed from the open state, the change in the opening angle of the torsion spring 96 acts such that the spring force becomes stronger than a spring force when the cover unit 34 is in the open state. Thus, the pressing force including the component in the +Y direction applied from the torsion spring 96 to the end portion of the movable unit 78 in the +Z direction is strengthened.

Here, since the pressing force acting from the torsion spring 96 becomes larger than the reaction force received from the coil spring 125, the second extension portion 134 of the roller support unit 102 is rotated in a direction in which it comes closer to the conveying roller 52.

In this way, the conveying roller 52 and the driven roller 54 form the nip. In addition, on the downstream side of the conveying roller 52 and the driven roller 54 in the inversion path T, the interval between the main body unit 22 and the movable unit 78 becomes a predetermined interval.

As described above, according to the document conveying device 20, when a so-called jam state occurs, in which the deformed document G is jammed in the inversion path T, the cover unit 34 is retracted with respect to the main body unit 22, and thus a part of the inversion path T is open. In this case, the cover unit 34 applies a pressing force to the roller support unit 102 in accordance with the opening operation.

The roller support unit 102 is rotated about the second rotation shaft 118 by receiving a force from the cover unit 34. Thus, the driven roller 54 is separated from the conveying roller 52.

The movable unit 78 is rotated about the first rotation shaft 86 by receiving a force from the roller support unit 102. Thus, the movable unit 78 is retracted from the main body unit 22.

As described above, the roller support unit 102 and the movable unit 78 are rotated in accordance with the opening operation of the cover unit 34, and the movable unit 78 is rotated relative to the roller support unit 102, and thus as compared to a configuration in which at least one of the roller support unit 102 and the movable unit 78 is fixed, it is possible to easily remove the document G in the jam state from the inversion path T.

According to the document conveying device 20, since the first extension portion 124 is positioned on one side with respect to the second rotation shaft 118 and the second extension portion 134 is positioned on the other side with respect to the second rotation shaft 118, the direction in which the second extension portion 134 receives the pressing force from the cover unit 34 and the direction in which the first extension portion 124 and the driven roller 54 separate from the conveying roller 52 can be set to be opposite to each other.

According to the document conveying device 20, in the closed state, the coil spring 125 applies an elastic force to the roller support unit 102, and thus the driven roller 54 comes closer to the conveying roller 52. Thus, in the nip formed by the driven roller 54 and the conveying roller 52, a nip pressure acting on the document G is ensured, and thus it is possible to inhibit a conveying failure of the document G in the nip.

According to the document conveying device 20, when there is one driven roller 54, the driven roller 54 is supported at a plurality of positions in the X direction, and thus bending of the driven roller 54 can be inhibited. When a plurality of driven rollers 54 are provided, an interval in the X direction between fulcrums at which the driven roller 54 is supported by the roller support units 102 decreases as compared to a case in which one roller support unit 102 is provided, and thus bending of the driven roller 54 can be inhibited.

According to the document conveying device 20, a downstream end of the conveyed document G in the conveying direction is guided by the sheet members 88 when the downstream end passes through a portion of the movable unit 78 that forms the inversion path T. Thus, it is possible to stabilize a posture of the document G conveyed from the movable unit 78 downstream in the conveying direction.

According to the document conveying device 20, even if the inner units 108 are located downstream from the middle units 112 and the outer units 114 in the +Y direction due to bending of members supporting the inner units 108, the middle units 112 and the outer units 114, the first contact surfaces 67 are located downstream from the second contact surfaces 73 and 77, and thus it is possible to match the timing at which the first contact surfaces 67 come into contact with the first contacted portions 135 with the timing at which the second contact surfaces 73 and 77 come into contact with the second contacted portions 142 and 146.

According to the document conveying device 20, the upstream end portion 104 of the roller support unit 102 in the conveying direction is located at a position farther than the path surface 84 in the +Y direction from the main body unit 22, and thus, when the document G is conveyed along the inversion path T, the downstream end of the document G in the conveying direction can be inhibited from being caught by the roller support unit 102 as compared to a configuration in which the upstream end portion 104 is located at a position closer than the path surface 84.

According to the document conveying device 20, the downstream end portion 106 of the roller support unit 102 in the conveying direction is located at a position closer to the main body unit 22 than the path surface 84, and thus, when the document G is conveyed along the inversion path T, the upstream end portion of the document G in the conveying direction is easily supported at a higher position than in a configuration in which the downstream end portion 106 is located farther than the path surface 84. Thus, when the upstream end portion of the document G in the conveying direction is separated from the path surface 84, it is possible to inhibit the upstream end portion of the document G from vibrating or bouncing up. In addition, it is possible to inhibit a large change in the posture of the document G when the upstream end portion of the document G moves out of the nip formed by the conveying roller 52 and the driven roller 54.

According to the document conveying device 20, since the first rotation shaft 86 and the third rotation shaft 42 are supported by the common frame member 24, relative positional accuracy between the first rotation shaft 86 and the third rotation shaft 42 is improved as compared to a configuration in which the first rotation shaft 86 and the third rotation shaft 42 are supported by different members. Thus, since relative positional accuracy between the roller support unit 102 supported by the movable unit 78 and the cover unit 34 is also improved, it is possible to inhibit a positional misalignment in the contact between the cover unit 34 and the roller support unit 102.

According to the document conveying device 20, the limiting portion 32 limits a rotation amount of a part of the roller support unit 102, thereby limiting the part of the roller support unit 102 from excessively coming closer to the main body unit 22. Thus, it is possible to inhibit a part of the inversion path T, specifically, an upstream region of the driven roller 54 and the conveying roller 52 from becoming narrower than necessary due to the rotation of the roller support unit 102.

According to the document conveying device 20, in the above-described second setting state, since the second interval S2 is wider than the first interval S1, the document G can be easily removed from the inversion path T. In the above-described third setting state, since the third interval S3 is wider than the second interval S2, the document G can be more easily removed from the inversion path T.

According to the scanner 10, when the jammed document G is removed from the inversion path T, remaining of a part of the document G in the inversion path T is inhibited, and thus, when the next reading operation of the document G is performed in the first reading portion 16 and the second reading portion 27, occurrence of a reading failure of the document G can be inhibited.

Although the document conveying device 20 and the scanner 10 according to the embodiments of the present disclosure are basically configured as described above, it is of course possible to perform changes, omissions, or combinations of partial configurations without departing from the gist of the present disclosure.

In the document conveying device 20, the roller support unit 102 may include an extension portion extending from the second rotation shaft 118 in only one direction. In a configuration in which a force acts on the roller support unit 102 so that the driven roller 54 comes closer to the conveying roller 52 in the closed state, the coil spring 125 may not be provided. Only one roller support unit 102 may be provided in the X direction.

The sheet members 88 may be made of one or both of a resin and a metal. Further, the sheet members 88 may not be provided.

In the document conveying device 20, the first contact surfaces 67 and the second contact surfaces 73 and 77 may be located at the same position in the moving direction. The upstream end portion 104 of the roller support unit 102 may be located at the same position relative to the main body unit 22 as the path surface 84. The first rotation shaft 86 and the third rotation shaft 42 may be supported by different members. The limiting portion 32 may not be provided. Also, the limiting portion 32 may be provided on a member different from the frame member 24 of the main body unit 22. The second interval S2 and the third interval S3 may be equal to each other.

The conveying roller 52 is not limited to having six elastic portions 52B in the X direction, and may have one elastic portion 52B or a plurality of elastic portions 52B other than six in the X direction.

The driven roller 54 is not limited to having six cylindrical portions 54B in the X direction, and may have one cylindrical portion 54B or a plurality of cylindrical portions 54B other than six in the X direction. Also, when a plurality of cylindrical portions 54B are provided, it is preferable that the number of cylindrical portions 54B be the same as the number of elastic portions 52B. The first rotation shaft 86 and the second rotation shaft 118 may be configured by using one shaft member in common.

Next, the swing member 116 that forms the roller support unit 102 will be further described with reference to FIG. 15 and subsequent figures and the figures already used in the description as necessary.

As described above with reference to FIG. 4, the arc portion Tr is included in the inversion path T which is a path from the separation roller pair 45 to the discharge roller pair 58. The arc portion Tr is a path from the first roller pair 48 to the third roller pair 56 and is an example of the curved path that inverts the medium while curving it. Also, as described above, the conveying roller 52 which is an example of the inner roller is provided on the inner side of the arc portion Tr, and the driven roller 54 which nips the document G with the conveying roller 52 is provided on the outer side of the arc portion Tr. The driven roller 54 is an example of the outer roller. As shown in FIG. 15, the driven roller 54 is rotatably supported by the swing member 116. The swing member 116 is swingable around the second rotation shaft 118 and swings to move the driven roller 54 closer to and away from the conveying roller 52.

As described with reference to FIG. 9, a part of the outer side of the arc portion Tr is formed by the path surface 84 of the main body portion 82. The main body portion 82 is an example of the path forming member.

Figure 17:
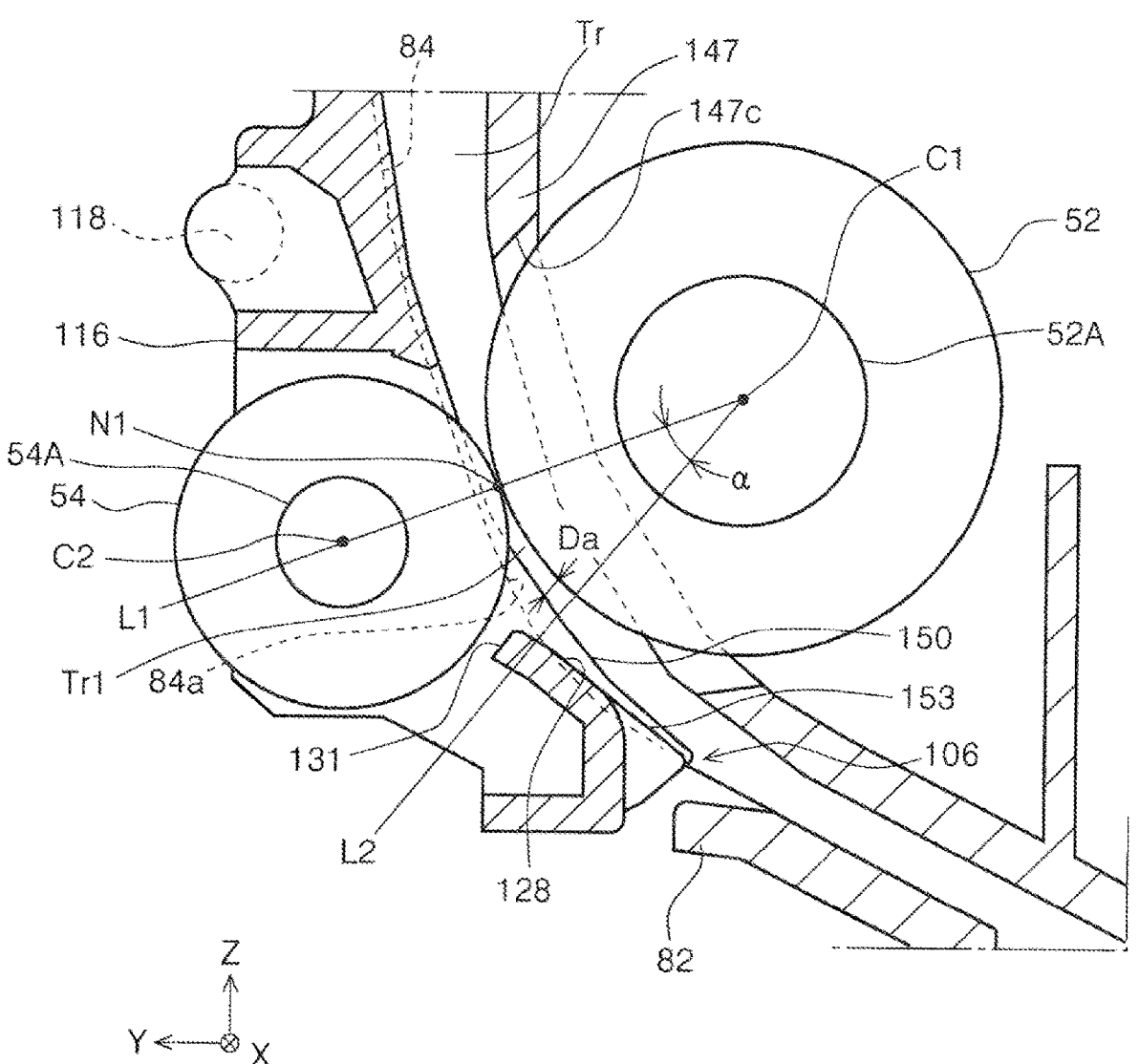
FIG. 17 is a diagram showing a document conveying path around a nip position between the conveying roller and the driven roller.

As shown in FIG. 17, a path portion extending from a nip position N1 between the conveying roller 52 and the driven roller 54 downstream in the conveying direction in the arc portion Tr is defined as a first path portion Tr1. In this embodiment, for example, the first path portion Tr1 is a path from the nip position N1 to an angle $\alpha$ downstream around a rotation axis center C1 of the conveying roller 52. In this embodiment, $\alpha=30°$, for example.

The rotation axis center C1 is an axial center of the rotation shaft portion 52A of the conveying roller 52. Also, a straight line L1 is a straight line passing through the rotation axis center C2 of the rotation shaft portion 54A of the driven roller 54 and the rotation axis center C1, and a straight line L2 is a straight line forming the angle $\alpha$ with the straight line L1 and passing through the rotation axis center C1. The first path portion Tr1 is a path portion between the straight line L1 and the straight line L2. The first path portion Tr1 may extend downstream from the nip position N1 in the conveying direction, and may or may not include the nip position N1.

A part of the outer side of the first path portion Tr1 is formed by the path surface 84 of the main body portion 82.

Figure 15:
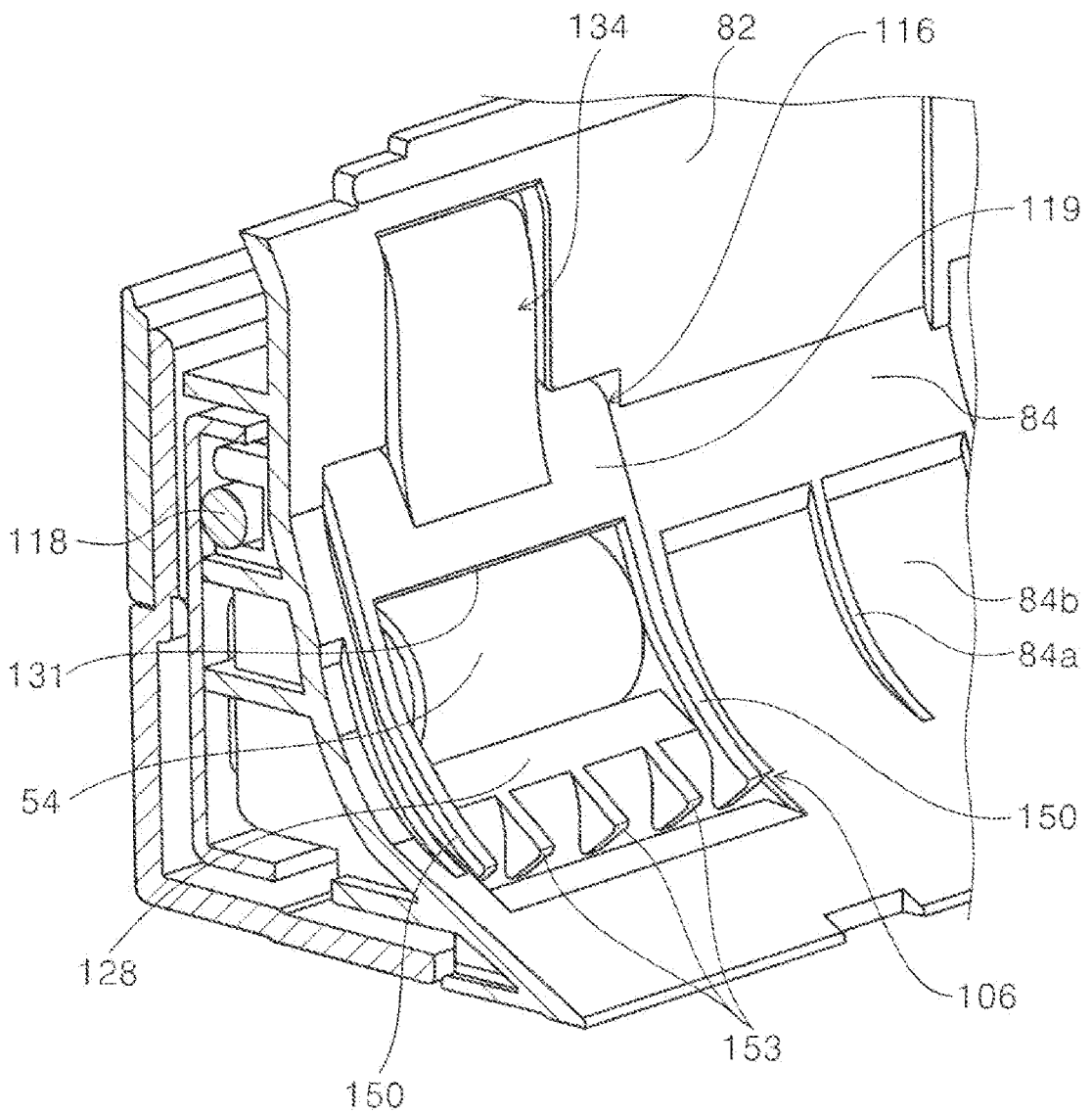
FIG. 15 is a perspective view of a roller support unit in a state in which it is attached to a main body portion.

Here, as shown in FIG. 15, the path surface 84 is configured by a curved surface 84b and a rib 84a from a position slightly upstream from the nip position N1 between the driven roller 54 and the conveying roller 52 in the conveying direction. The rib 84a extends to a position slightly upstream in the conveying direction from the downstream end portion 106 of the swing member 116 in the conveying direction. The rib 84a protrudes further inward of the arc portion Tr than the curved surface 84b. A plurality of ribs 84a are formed at appropriate intervals in the width direction in the main body portion 82.

Figure 16:
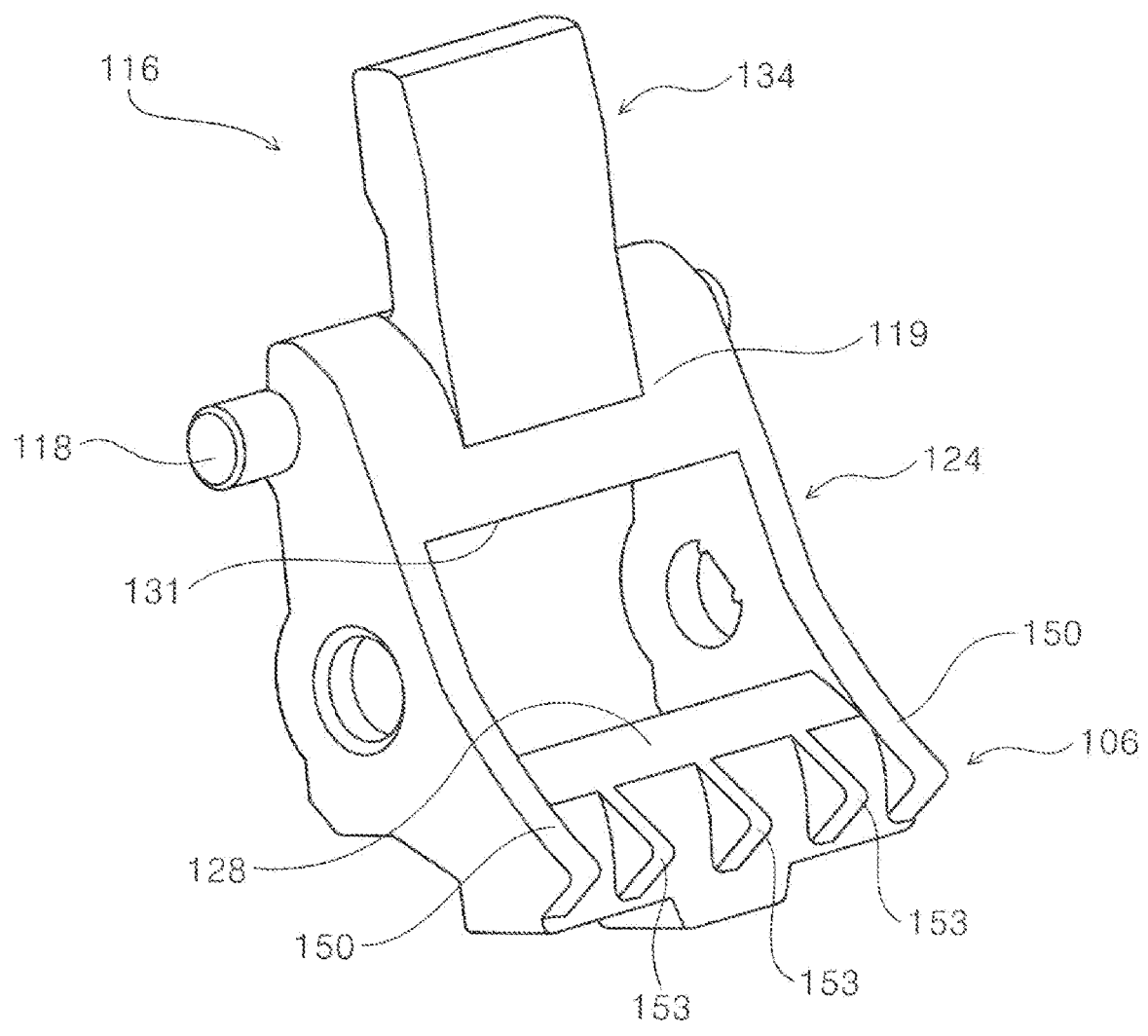
FIG. 16 is a perspective view of a swing member.

Here, as shown in FIG. 17, a part of a circumferential surface of the conveying roller 52 forms an inner side of the first path portion Tr1. Also, as shown in FIGS. 15 and 16, an outer rib 150, which is an example of the support portion and the first support portion, and an inner rib 153, which is an example of the second support portion, are provided on a surface of the swing member 116 facing the main body unit 22, which is an example of the first unit.

The outer rib 150 is provided laterally with respect to the driven roller 54 in the width direction. In addition, the inner rib 153 is provided on a lateral side of the outer rib 150 in the width direction and in a region of the driven roller 54. Also, in this embodiment, a length of the driven roller 54 and a length of the conveying roller 52 in the width direction are the same, and an inner side of a region of the driven roller 54 is an inner side of a region of the conveying roller 52.

In this embodiment, an upstream end of the outer rib 150 in the conveying direction is at a position of an upstream end of the opening portion 131, and a downstream end of the outer rib 150 in the conveying direction is at a position of the downstream end portion 106 of the swing member 116.

Thus, the outer rib 150 includes the nip position N1 in the conveying direction and extends upstream and downstream from the nip position N1.

Further, in this embodiment, an upstream end of the inner rib 153 in the conveying direction is at a position of a downstream end of the second guide wall 128, and a downstream end of the inner rib 153 in the conveying direction is at a position of the downstream end portion 106 of the swing member 116.

The outer ribs 150 are provided on both sides of the swing member 116 in the width direction. Further, three inner ribs 153 are formed at intervals in the width direction.

However, the outer rib 150 may be provided only on one side of the swing member 116 in the width direction. In addition, one inner rib 153 may be provided in the width direction, or four or more inner ribs may be provided. Also, instead of a rib shape, the inner rib 153 may be a flat surface extending in the width direction.

As shown in FIG. 17, an inner side of the arc portion Tr, which is a part of the inversion path T, is formed by a unit frame 147 that forms a base body of the main body unit 22, and the conveying roller 52 protrudes into the arc portion Tr from an opening portion 147c formed in the unit frame 147. Thus, a part of the inner side of the arc portion Tr is formed by the unit frame 147 and the circumferential surface of the conveying roller 52. In addition, an inner side of the first path portion Tr1, which is a part of the arc portion Tr, is formed by the circumferential surface of the conveying roller 52 and the unit frame 147 in the width direction. However, since the circumferential surface of the conveying roller 52 protrudes further outward in the arc portion Tr than the unit frame 147, the inner side of the first path portion Tr1 is substantially formed by the circumferential surface of the conveying roller 52.

On the other hand, the outer side of the first path portion Tr1 is formed in the width direction by the outer rib 150 of the swing member 116, an upstream portion of the second guide wall 128, and the rib 84a and the curved surface 84b forming the path surface 84.

Here, as described above, the rib 84a forming the path surface 84 protrudes further inward of the arc portion Tr than the curved surface 84b, and the outer rib 150 protrudes further inward of the arc portion Tr than the rib 84a forming the path surface 84. Thus, the following operations and effects are obtained.

That is, the document G is curved at the arc portion Tr, and thus, when the trailing end of the document G moves out of the nip position N1 between the conveying roller 52 and the driven roller 54, the trailing end of the document G suddenly moves to the outside of the first path portion Tr1. Such a sudden movement of the trailing end of the document G to the outside of the first path portion Tr1 causes a temporary conveyance disturbance, and thus causes a temporary deterioration in reading accuracy.

However, the swing member 116 is provided with the outer rib 150 which is a support portion for supporting the trailing end of the document G moving out of the nip position N1 on the lateral side of the driven roller 54 in the width direction, and the outer rib 150 protrudes further inward of the arc portion Tr than the rib 84a forming the path surface 84 in the first path portion Tr1, and thus, when the trailing end of the document G moves out of the nip position N1, the trailing end of the document G is supported by the outer rib 150. For this reason, sudden movement of the trailing end of the document G to the outside of the first path portion Tr1 is inhibited, and thus temporary distortion of a read image can be inhibited.

In addition, the sudden movement of the trailing end of the document G to the outside of the first path portion Tr1 can also be inhibited by increasing a protruding height of the rib 84a forming the path surface 84, but in this case, the clearance (clearance in the document thickness direction) in the first path portion Tr1 becomes small, and thus a conveying load when a thick document G or a document G having high rigidity is conveyed increases. However, in this embodiment, since the outer rib 150 is provided in the swingable swing member 116, the outer rib 150 can be displaced in accordance with the thickness or rigidity of the document G, and thus it is possible to curb the conveying load when the thick document G or the document G having high rigidity is conveyed.

In addition, when a relative position between the nip position N1 and the outer rib 150 varies, there is a concern that the trailing end of the document G cannot be appropriately supported by the outer rib 150 when the trailing end of the document G moves out of the nip position N1. However, since the outer rib 150 is provided in the swing member 116 that supports the driven roller 54, the relative position between the nip position N1 and the outer rib 150 is appropriately determined, and thus the trailing end of the document G can be appropriately supported by the outer rib 150 when the trailing end of the document G moves out of the nip position N1.

Further, in this embodiment, since the outer ribs 150 are provided on both sides of the driven roller 54 in the width direction, it is possible to stably support the trailing end of the document G when the trailing end of the document G moves out of the nip position N1, and thus it is possible to satisfactorily inhibit temporary distortion of the read image.

In addition, in this embodiment, since the outer rib 150 protrudes further inward of the first path portion Tr1 than the path surface 84 of the main body portion 82 in the entire region of the first path portion Tr1, the relative position between the nip position N1 and the outer rib 150 is determined in the entire region of the first path portion Tr1, and the trailing end of the document G moving out of the nip position N1 can be appropriately supported by the outer rib 150.

Further, in this embodiment, since the outer rib 150 extends to the downstream end portion 106 of the swing member 116 in the conveying direction, it is possible to support the trailing end of the document G moving out of the nip position N1 over a wide region in the conveying direction. In this way, it is possible to appropriately inhibit sudden movement of the trailing end of the document G to the outside of the first path portion Tr1 and to appropriately inhibit temporary distortion of the read image.

In addition, in this embodiment, since the first path portion Tr1 extends from the nip position N1 to a position advanced, from the nip position, by the angle α=30° downstream in the conveying direction around the rotation axis center C1 of the conveying roller 52, it is possible to support the trailing end of the document G moving out of the nip position N1 over a wide region in the conveying direction. In this way, it is possible to appropriately inhibit sudden movement of the trailing end of the document G to the outside of the first path portion Tr1 and to appropriately inhibit temporary distortion of the read image.

Also, needless to say, the angle α is not limited to 30°. A range of the first path portion Tr1 in the conveying direction is set from the viewpoint of inhibiting sudden movement of the trailing end of the document G when the trailing end of the document G moves out of the nip position N1, and can be appropriately set in accordance with a device configuration based on this viewpoint.

Also, in this embodiment, a maximum value of a clearance Da between the outer rib 150 and the circumferential surface of the conveying roller 52 in the first path portion Tr1 is set to be equal to or less than twice the clearance Da in the nip position N1. Thus, the clearance Da downstream from the nip position N1 does not rapidly increase as compared with the clearance at the nip position N1. In this way, sudden movement of the trailing end of the document G to the outside of the first path portion Tr1 after the trailing end of the document G moved out of the nip position N1 can be appropriately inhibited, and temporary distortion of the read image can be appropriately inhibited.

In addition, even if the maximum value of the clearance Da between the outer rib 150 and the circumferential surface of the conveying roller 52 exceeds twice the clearance Da at the nip position N1, it is sufficient as long as it can inhibit sudden movement of the trailing end of the document G after the trailing end of the document G moved out of the nip position N1.

Further, the clearance Da can also be referred to as a clearance in the thickness direction of the conveyed document G.

Also, in this embodiment, the outer rib 150 serves as the first support portion, and the swing member 116 integrally includes the inner rib 153 serving as the second support portion that supports the trailing end of the document G downstream from the driven roller 54 in the conveying direction and on a lateral side of the outer rib 150 in the width direction. Thus, the trailing end of the document G which is not supported by the outer rib 150 is supported by the inner rib 153, and thus the document G can be stably conveyed.

Figure 18:
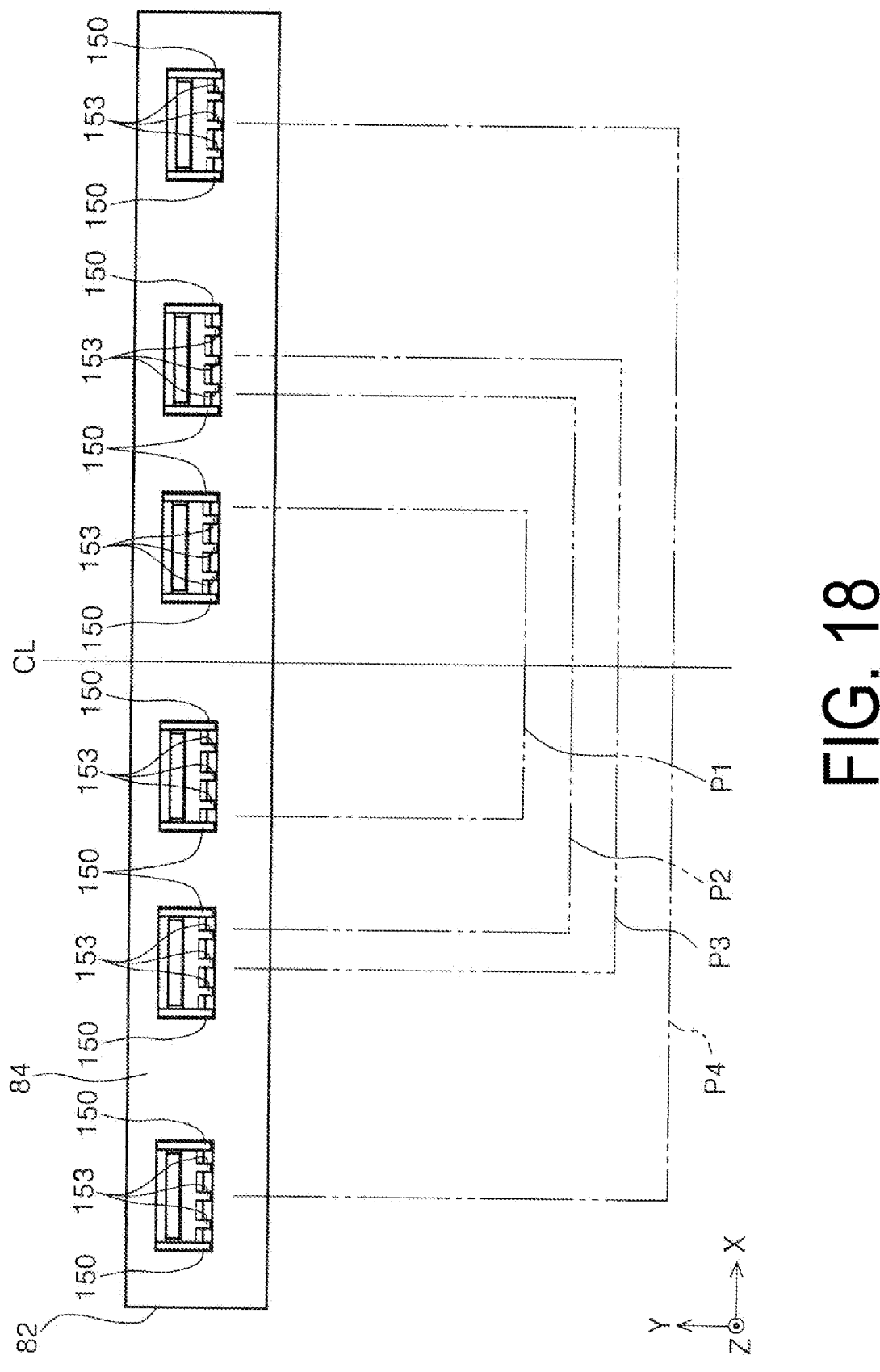
FIG. 18 is a plan view of the main body portion and the roller support unit.

In addition, FIG. 18 shows positional relations between various document sizes and the inner rib 153, and reference numerals P1, P2, P3, and P4 denote documents of different sizes. Also, a straight line CL indicates a center position in the width direction. Swing members 116 are disposed at positions bilaterally symmetrical with respect to the center position CL in the width direction. In addition, the inner ribs 153 support side ends of documents in the width direction, and thus the side edges of the documents in the width direction can be stably conveyed.

In addition, in this embodiment, the inner rib 153 does not protrude further inward of the arc portion Tr than the outer rib 150. In this way, the clearance of the arc portion Tr (the clearance in the thickness direction of the conveyed document G) does not become narrower than necessary, the conveying load can be curbed, and thus distortion of the read image can be inhibited.

Further, in this embodiment, since the second support portion is configured by the plurality of inner ribs 153 disposed at intervals in the width direction, a contact area with the document G can be reduced, the conveying load can be curbed, and thus distortion of the read image can be inhibited.

In addition, in this embodiment, since the first support portion is configured by the outer ribs 150 extending in the conveying direction, the contact area with the document G can be reduced, the conveying load can be curbed, and thus distortion of the read image can be inhibited.

Figure 19:
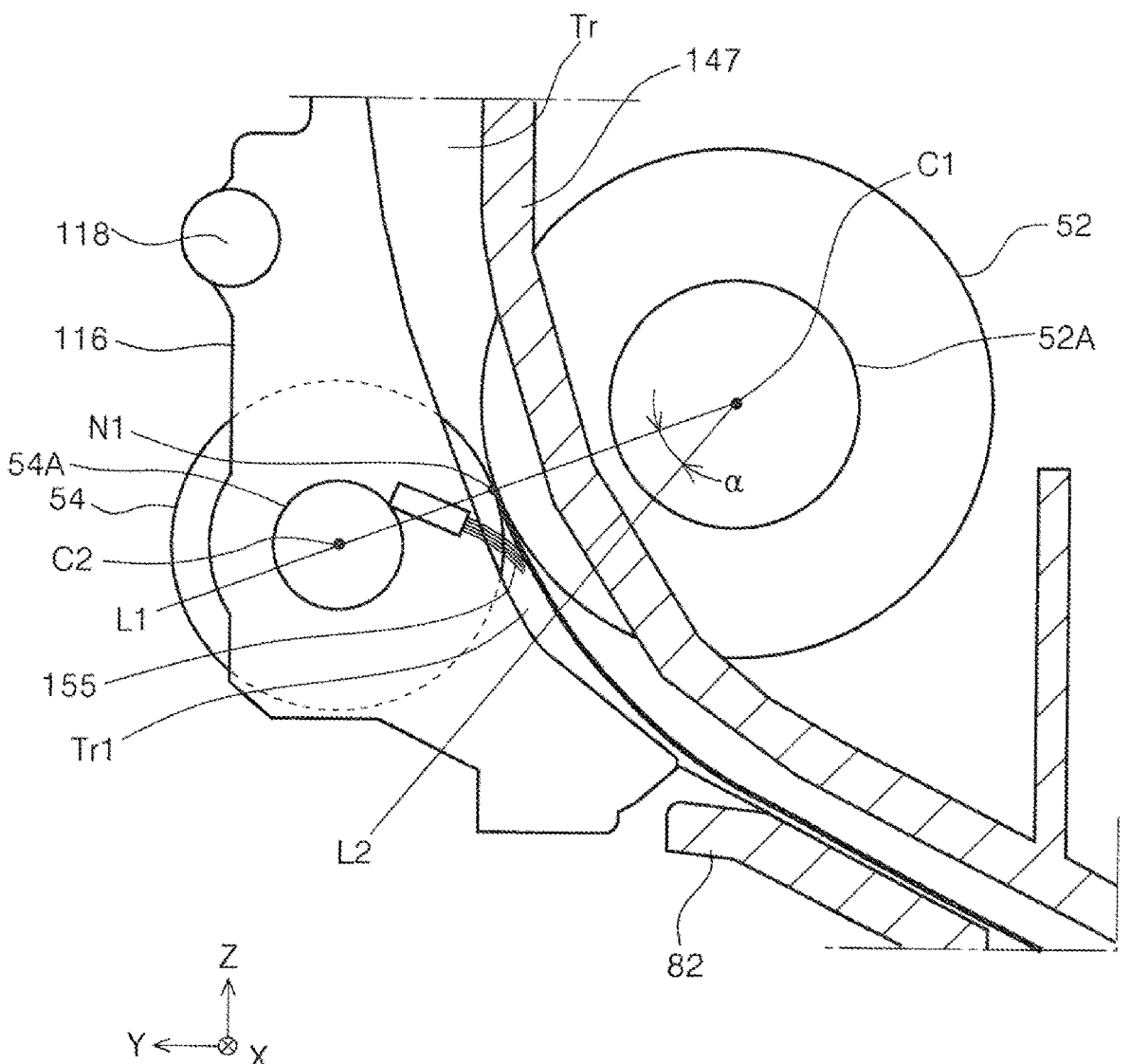
FIG. 19 is a diagram showing a document conveying path around a nip position between a conveying roller and a driven roller, which shows another embodiment.

Next, another embodiment of the support portion will be described with reference to FIG. 19. In FIG. 19, the support portion is formed of a deformable member that is deformable by coming into contact with the document G. In FIG.

19, a brush 155 is used as an example of the deformable member. The brush 155 is provided on both side portions of the swing member 116 in the width direction, but may be provided on one side portion. With such a configuration, when the trailing end of the document G moves out of the nip position N1, the trailing end of the document G comes into contact with the brush 155, and elasticity of the brush 155 inhibits movement of the trailing end of the document G toward the outside of the first path portion Tr1. For this reason, sudden movement of the trailing end of the document G to the outside of the first path portion Tr1 is inhibited, and thus temporary distortion of the read image can be inhibited.

Also, the deformable member is not limited to the brush 155, and other materials such as an elastic sheet may be used. In addition, when the brush 155 is used as in this embodiment, the brush 155 is grounded and configured as a destaticizing brush, so that the document G can be destaticized, adhesion of the document G to the outer side of the arc portion Tr is inhibited, so that appropriate conveyance accuracy can be obtained, and thus distortion of the read image can be inhibited.

Figure 20:
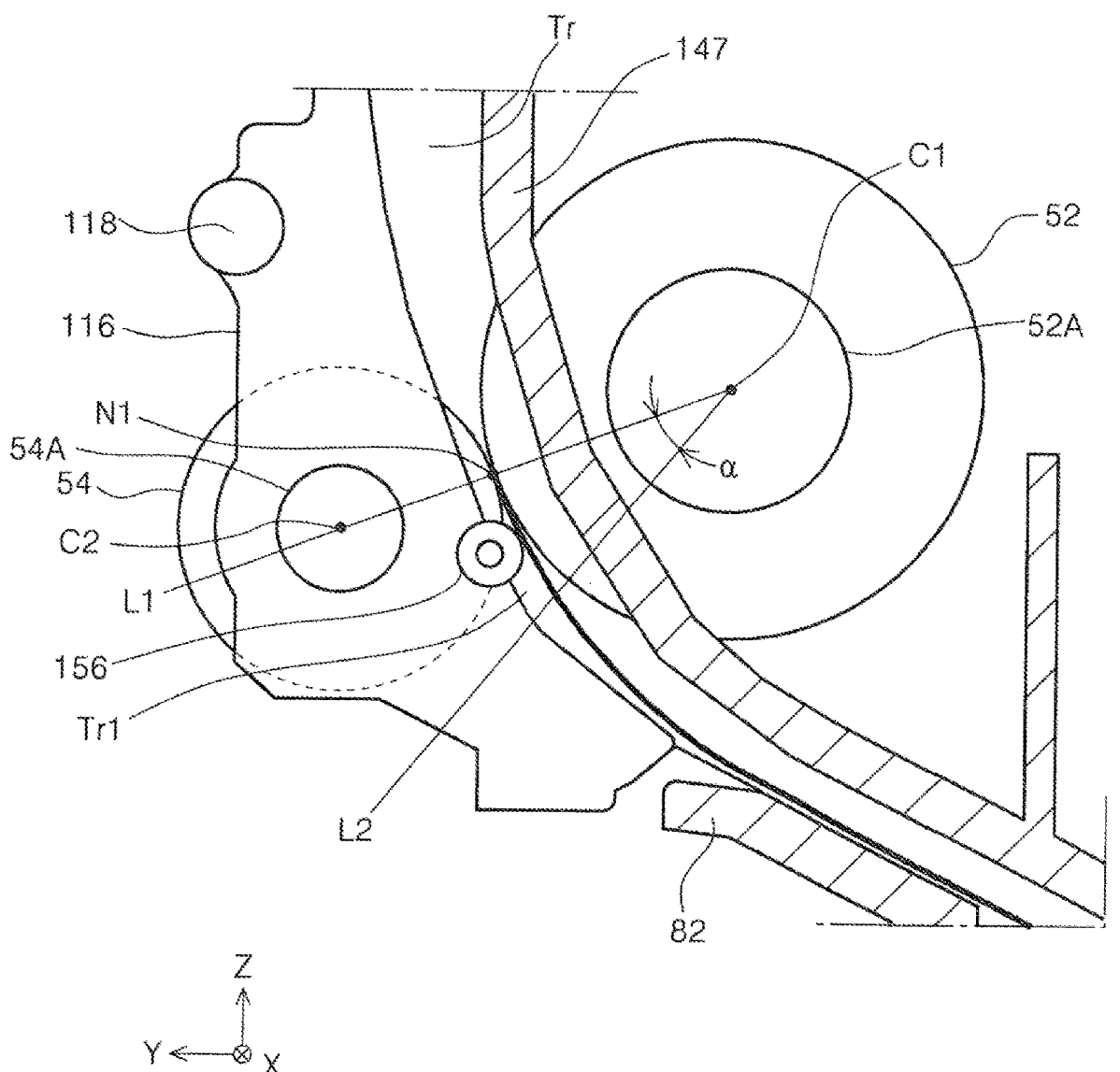
FIG. 20 is a diagram showing a document conveying path around a nip position between a conveying roller and a driven roller, which shows another embodiment.

Further, as shown in FIG. 20, the support portion may be configured by a driven roller 156 which can be driven to rotate by coming into contact with the document G. Thus, the conveying load of the document G can be curbed, and thus distortion of the read image can be inhibited.

The driven roller 156 may be provided on both side portions of the swing member 116 in the width direction in the same manner as the brush 155 described above, or may be provided on one side portion.

In addition, the driven roller 156 may be extended over the entire region in the width direction in the swing member 116.

Figure 21:
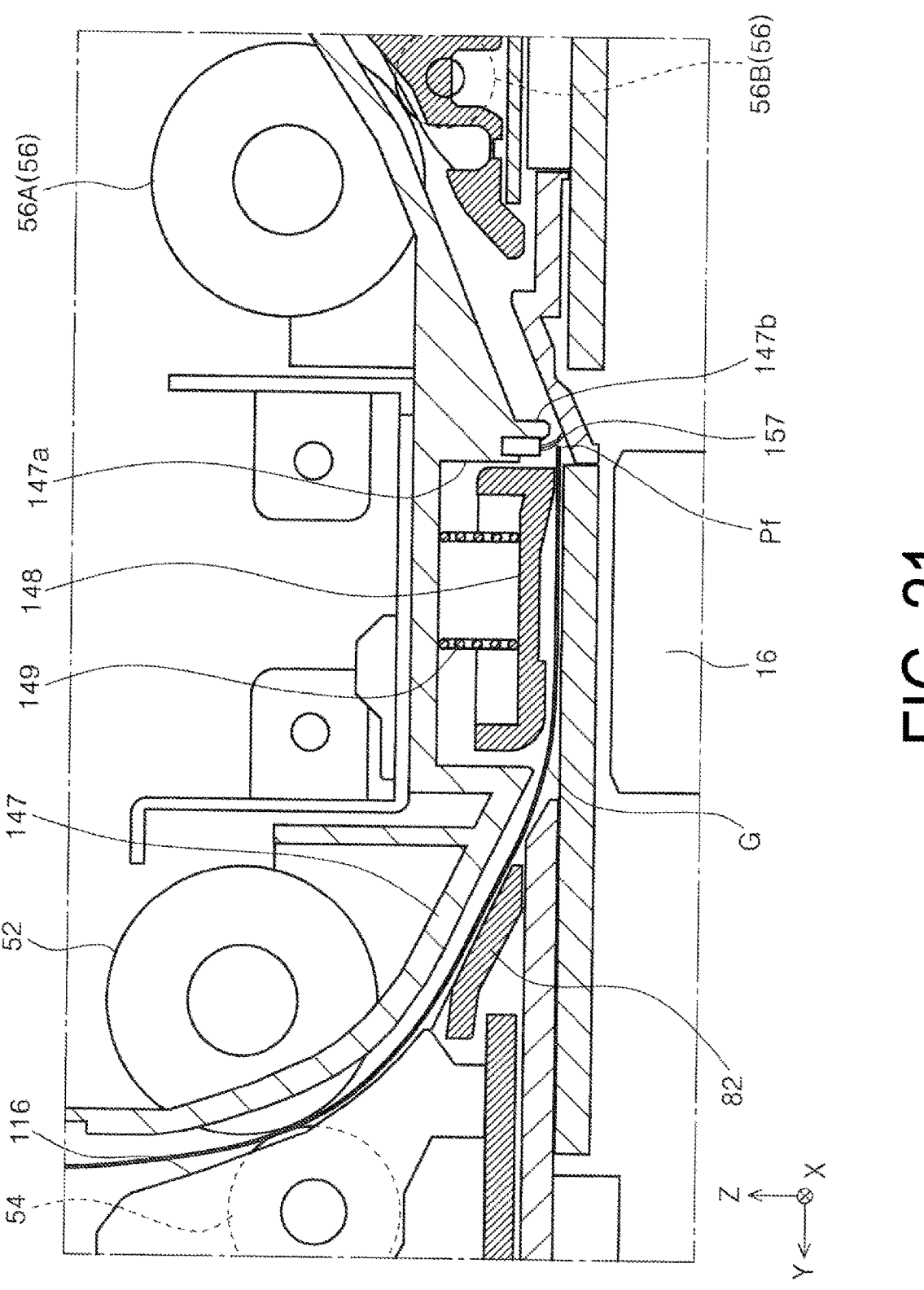
FIG. 21 is a diagram showing a document conveying path around a first reading portion.

Next, other features of the document conveying device 20 according to this embodiment will be described. In FIG. 21, a pressing portion 148 that is movable closer to and away from the first reading portion 16 and presses the document G toward the first reading portion 16 is provided at a position facing the first reading portion 16. The pressing portion 148 is housed in a housing portion 147a formed in the unit frame 147 and is provided to be displaceable in a direction in which it moves closer to and away from the first reading portion 16 (a Z axis direction). A coil spring 149, which is an example of a pressing member, is provided in the housing portion 147a, and the pressing portion 148 is pressed toward the first reading portion 16 by the coil spring 149. Also, a displacement limit of the pressing portion 148 in a direction of coming closer to the first reading portion 16 is set by a regulating unit (not shown).

According to such a configuration, since the pressing portion 148 is displaced in accordance with the thickness of the document G, it is possible to appropriately maintain an interval between a surface of the document G and the first reading portion 16 regardless of the thickness of the document G.

Here, when the pressing portion 148 receives an excessive reaction force from the document G, the pressing portion 148 is inappropriately pushed up, and the interval between the surface of the document G and the first reading portion 16 becomes inappropriately large. In order to inhibit this, a regulating portion 147b that regulates movement of the document G in a direction away from the first reading portion 16 is provided downstream from the pressing portion 148 in the conveying direction.

However, when a leading end Pf of the document G is about to pass through the regulating portion 147b, there is a concern that the leading end Pf of the document G may be caught by the regulating portion 147b to temporarily reduce the conveying accuracy, thereby causing distortion of the read image. In this embodiment, in order to inhibit this, a brush 157 that guides the leading end Pf of the document G to a top portion (a top portion in the −Z direction) of the regulating portion 147b is provided between the pressing portion 148 and the regulating portion 147b in the conveying direction. The brush 157 is an example of a guiding unit that guides the leading end Pf of the document G to the top portion (the top portion in the −Z direction) of the regulating portion 147b. When the leading end Pf of the document G abuts the brush 157, the brush 157 is deformed as shown in FIG. 21 and guides the leading end Pf of the document G to the top portion (the top portion in the −Z direction) of the regulating portion 147b. Thus, it is possible to inhibit deterioration of the conveyance accuracy and to inhibit distortion of the read image.

Figure 22:
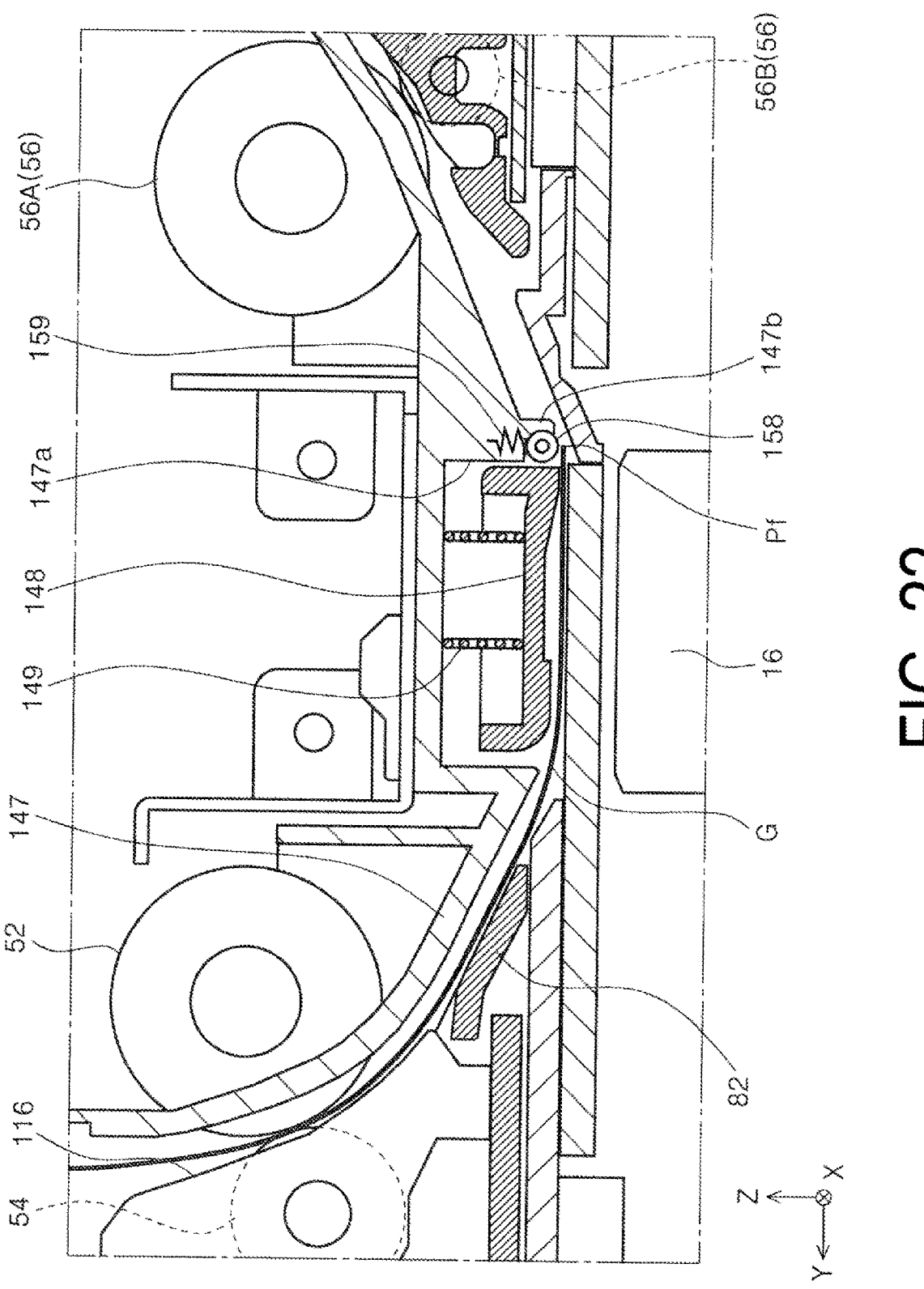
FIG. 22 is a diagram showing a document conveying path around a first reading portion, which shows another embodiment.

Also, as shown in FIG. 22, the guiding unit may be configured by a driven roller 158 which is driven to rotate by coming into contact with the leading end Pf of the document G. The driven roller 158 is displaceable in the Z axis direction and is pressed in the −Z direction by a coil spring 159 which is an example of the pressing member. Also, a displacement limit of the driven roller 158 in the −Z direction is set by a regulating unit (not shown). When the leading end Pf of the document G comes into contact with the driven roller 158, the driven roller 158 is driven to rotate and guides the leading end Pf of the document G to the top portion (the top portion in the −Z direction) of the regulating portion 147b. Thus, it is possible to inhibit deterioration of the conveyance accuracy and to inhibit distortion of the read image.

It is needless to say that the present disclosure is not limited to each embodiment described above, and various modifications are possible within the scope of the present disclosure as described in the appended claims, which also fall within the scope of the present disclosure.

In particular, in the embodiments described above, the document conveying device 20 is a device that conveys the document G, which is an example of the medium, and is a medium conveying device applied to the scanner 10, which is an example of the image reading device, and the document conveying device 20 may be a medium conveying device that conveys a medium in a recording device including a recording portion that performs recording on the medium, for example, an ink jet head.

What is claimed is:

1. An Image reading device comprising:
an inversion path including a curved path that inverts a medium while curving the medium;
an inner roller that is provided on an inner side of the curved path and conveys the medium downstream in a conveying direction thereof;
an outer roller that is provided on an outer side of the curved path and nips the medium with the inner roller;
a first reading portion that is located downstream in the conveying direction from the inner roller and the outer roller and reads an image on the medium;
a swing member that is a member rotatably supporting the outer roller, is swingable, and swings to move the outer roller closer to and away from the inner roller;
a path forming member that forms an outer side of a first path portion when a path portion of the curved path extending downstream in the conveying direction from the nip position between the inner roller and the outer roller is defined as the first path portion;

a first unit that forms the inner side of the inversion path and includes the inner roller;
a second unit that forms the outer side of the inversion path and retracts with respect to the first unit to open a part of the inversion path; and
a third unit that forms the outer side of the inversion path downstream from the second unit in the conveying direction, includes the path forming member, and is provided rotatably around a first rotation shaft to be movable closer to and away from the first unit, wherein
a part of a circumferential surface of the inner roller forms an inner side of the first path portion, a support portion that supports a trailing end of the medium that is out of the nip position is provided in the swing member laterally with respect to the outer roller in a width direction that is a direction intersecting the conveying direction, and the support portion protrudes further inward of the curved path than the path forming member in the first path portion,
the swing member is rotatably provided in the third unit via a second rotation shaft,
the second unit is configured to apply a pressing force to the support portion in accordance with an opening operation thereof,
the swing member is rotatable in a direction in which the outer roller moves away from the inner roller by receiving a force from the second unit, and
the third unit is rotatable in a retracting direction with respect to the first unit by receiving a force from the swing member in accordance with the opening operation of the second unit.

2. The image reading device according to claim 1, wherein
the support portions are provided on both sides of the outer roller in the width direction.

3. The image reading device according to claim 2, wherein the support portions protrude further inward of the first path portion than the path forming member.

4. The image reading device according to claim 3, wherein
the support portions extend to a downstream end of the swing member in the conveying direction.

5. The image reading device according to claim 3, wherein
the first path portion extends from the nip position to a position advanced, from the nip position, by an angle of 30° downstream in the conveying direction around a rotation axis center of the inner roller.

6. The image reading device according to claim 3, wherein
a maximum value of a clearance between the support portion and the circumferential surface of the inner roller in the first path portion is equal to or less than twice the clearance at the nip position.

7. An Image reading device comprising:
an inversion path including a curved path that inverts a medium while curving the medium;
an inner roller that is provided on an inner side of the curved path and conveys the medium downstream in a conveying direction thereof;
an outer roller that is provided on an outer side of the curved path and nips the medium with the inner roller;
a first reading portion that is located downstream in the conveying direction from the inner roller and the outer roller and reads an image on the medium;

a swing member that is a member rotatably supporting the outer roller, is swingable, and swings to move the outer roller closer to and away from the inner roller; and a path forming member that forms an outer side of a first path portion when a path portion of the curved path extending downstream in the conveying direction from the nip position between the inner roller and the outer roller is defined as the first path portion, wherein a part of a circumferential surface of the inner roller forms an inner side of the first path portion, a support portion that supports a trailing end of the medium that is out of the nip position is provided in the swing member laterally with respect to the outer roller in a width direction that is a direction intersecting the conveying direction, and the support portion protrudes further inward of the curved path than the path forming member in the first path portion, the support portion serves as a first support portion, and the swing member integrally includes a second support portion that supports the trailing end of the medium at a position downstream from the outer roller in the conveying direction and on a lateral side of the first support portion in the width direction, the second support portion does not protrude further inward of the curved path than the first support portion, and the second support portion includes a plurality of ribs disposed at intervals in the width direction.

8. The image reading device according to claim 1, wherein the support portion includes a rib extending along the conveying direction.

9. The image reading device according to claim 1, wherein the support portion is configured by a deformable member that is deformable by coming into contact with the medium.

10. An Image reading device comprising:

an inversion path including a curved path that inverts a medium while curving the medium;

an inner roller that is provided on an inner side of the curved path and conveys the medium downstream in a conveying direction thereof;

an outer roller that is provided on an outer side of the curved path and nips the medium with the inner roller;

a first reading portion that is located downstream in the conveying direction from the inner roller and the outer roller and reads an image on the medium;

a swing member that is a member rotatably supporting the outer roller, is swingable, and swings to move the outer roller closer to and away from the inner roller; and a path forming member that forms an outer side of a first path portion when a path portion of the curved path extending downstream in the conveying direction from the nip position between the inner roller and the outer roller is defined as the first path portion, wherein a part of a circumferential surface of the inner roller forms an inner side of the first path portion, a support portion that supports a trailing end of the medium that is out of the nip position is provided in the swing member laterally with respect to the outer roller in a width direction that is a direction intersecting the conveying direction, and the support portion protrudes further inward of the curved path than the path forming member in the first path portion, and the support portion is configured by a driven roller configured to be driven to rotate by coming into contact with the medium.

11. The image reading device according to claim 1, wherein the first reading portion is located outside the inversion path and includes a pressing portion at a position on an inner side of the inversion path and facing the first reading portion with the inversion path interposed therebetween, the pressing portion being configured to move closer to and away from the first reading portion and to press the medium toward the first reading portion, a protruding portion of a unit frame that regulates movement of the medium in a direction away from the first reading portion is provided downstream from the pressing portion in the conveying direction, and a driven roller that guides the medium to a top portion of the regulating portion is provided between the pressing portion and the regulating portion in the conveying direction.

* * * * *